(12) United States Patent
Lessard et al.

(10) Patent No.: US 12,714,123 B2
(45) Date of Patent: Aug. 25, 2026

(54) DUAL-USE COOLING FAN FOR DRINK MAKER

(71) Applicant: SharkNinja Operating LLC, Needham, MA (US)

(72) Inventors: Derek Lessard, Brighton, MA (US); Michael Lerman, Providence, RI (US); Lloyd Olson, Auburn, MA (US); Ryan Michienzi, Brighton, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/426,942

(22) Filed: Jan. 30, 2024

(65) Prior Publication Data

US 2025/0234889 A1 Jul. 24, 2025

Related U.S. Application Data

(63) Continuation of application No. 18/424,536, filed on Jan. 26, 2024, which is a continuation-in-part of application No. 18/415,817, filed on Jan. 18, 2024.

(51) Int. Cl.
*A23G 9/22* (2006.01)
*F25D 23/00* (2006.01)

(52) U.S. Cl.
CPC ............. *A23G 9/22* (2013.01); *F25D 23/003* (2013.01); *F25D 2323/00284* (2013.01)

(58) Field of Classification Search
CPC .................... A23G 9/22; F25D 23/003; F25D 2323/00284
See application file for complete search history.

(56) References Cited

U.S. PATENT DOCUMENTS

| | | | |
|---|---|---|---|
| 531,718 | A | 1/1895 | Detwiler et al. |
| 718,319 | A | 1/1903 | Cunningham |
| 789,599 | A | 5/1905 | Flatau |
| 970,823 | A | 9/1910 | Hopkins |
| 975,380 | A | 11/1910 | Berntson |
| 1,425,814 | A | 8/1922 | Valerius et al. |
| 1,685,189 | A | 9/1928 | Cover |
| 1,818,896 | A | 8/1931 | Kohr |

(Continued)

FOREIGN PATENT DOCUMENTS

| | | | |
|---|---|---|---|
| CA | 2465482 | C | 2/2008 |
| CH | 168408 | A | 4/1934 |

(Continued)

OTHER PUBLICATIONS

Complaint for Declaratory Judgment, *Foshan Macjerry Technology Co., Ltd.* v. *SharkNinja Operating LLC*, No. 2:25- cv-00954 (W.D. Wash. May 19, 2025), 59 pages.

(Continued)

*Primary Examiner* — Jerry-Daryl Fletcher
*Assistant Examiner* — Keith Stanley Myers
(74) *Attorney, Agent, or Firm* — The Webb Law Firm

(57) ABSTRACT

A drink maker includes a mixing vessel arranged to receive a drink product and a dasher, driven by a drive motor, that is arranged to mix the drink product within the mixing vessel. A refrigeration circuit is arranged to cool the drink product within the mixing vessel. The refrigeration circuit includes a condenser. A cooling fan is configured to concurrently cool the drive motor and the condenser.

15 Claims, 7 Drawing Sheets

(56) References Cited

U.S. PATENT DOCUMENTS 1,896,081 A 2/1933 Hampson
1,953,766 A 4/1934 McMath et al.
2,064,861 A 12/1936 Stroud
2,134,261 A 10/1938 Oswell et al.
2,136,224 A 11/1938 Weinreich
2,141,045 A 12/1938 Ruttiman
2,188,551 A 1/1940 Kaltenbach et al.
2,252,205 A 8/1941 Reynolds
2,278,125 A 3/1942 Landgraf
2,284,155 A 5/1942 Landgraf
2,316,165 A 4/1943 Howser
2,352,205 A 6/1944 Karlson
2,352,232 A 6/1944 Strauss
2,411,081 A 11/1946 Carothers
2,541,814 A 2/1951 Gaddini
2,794,627 A 6/1957 Rodwick
2,828,113 A 3/1958 Knibb
2,896,421 A 7/1959 Rader
2,897,862 A 8/1959 Malz et al.
2,928,660 A 3/1960 Knibb
2,972,239 A 2/1961 Vasby
3,155,053 A 11/1964 De Vito et al.
3,175,594 A 3/1965 Jepson et al.
3,191,398 A 6/1965 Rader
3,228,203 A 1/1966 Swenson
3,240,246 A 3/1966 Dewenter
3,292,911 A 12/1966 Paul
3,300,094 A 1/1967 Rockola
3,319,436 A 5/1967 Wilch
3,400,551 A 9/1968 Booth et al.
3,460,716 A 8/1969 Thomas
3,460,717 A 8/1969 Thomas
3,465,540 A 9/1969 Carpigiani
3,580,812 A 5/1971 Bender et al.
3,632,245 A 1/1972 Getman
3,661,303 A 5/1972 Prosenbauer
3,822,565 A * 7/1974 Arzberger ............ G07F 13/025
62/394
3,939,667 A 2/1976 Halverson
3,988,902 A 11/1976 Jacobs
4,078,263 A 3/1978 Campbell
4,084,407 A 4/1978 Anhalt
4,108,054 A 8/1978 Klocker et al.
4,157,017 A 6/1979 Reid
4,162,127 A 7/1979 Wakeman et al.
4,201,112 A 5/1980 Owens
4,241,590 A 12/1980 Martineau
4,245,680 A 1/1981 Greenfield, Jr. et al.
4,275,567 A 6/1981 Schwitters
4,332,539 A 6/1982 Zani
4,394,938 A 7/1983 Frassanito
4,401,607 A 8/1983 Child et al.
4,429,549 A 2/1984 Randolphi
4,476,146 A 10/1984 Manfroni
4,487,024 A 12/1984 Fletcher et al.
4,521,116 A 6/1985 Adsit
4,528,824 A 7/1985 Herbert
4,547,076 A 10/1985 Maurer
4,637,221 A 1/1987 Levine
4,653,281 A 3/1987 Van Der Veer
4,664,529 A 5/1987 Cavalli
4,681,030 A 7/1987 Herbert
4,681,458 A 7/1987 Cavalli
4,698,984 A 10/1987 Manfroni
4,708,487 A 11/1987 Marshall
4,711,374 A 12/1987 Gaunt et al.
4,711,376 A 12/1987 Manfroni
4,712,920 A 12/1987 Ames et al.
4,725,008 A 2/1988 Rebordosa et al.
4,736,593 A 4/1988 Williams
4,740,088 A 4/1988 Kelly, Jr.
4,796,440 A 1/1989 Shiotani et al.
4,900,158 A 2/1990 Ugolini
4,906,486 A 3/1990 Young
4,964,542 A 10/1990 Smith
5,020,698 A 6/1991 Crossley
5,158,506 A 10/1992 Kusano et al.
5,190,189 A * 3/1993 Zimmer ............... B67D 1/0068
261/DIG. 7
5,205,129 A 4/1993 Wright et al.
5,212,954 A 5/1993 Black et al.
5,305,923 A 4/1994 Kirschner et al.
5,363,746 A 11/1994 Gordon
5,389,209 A 2/1995 Paquette
5,419,150 A 5/1995 Kaiser et al.
5,463,878 A 11/1995 Parekh et al.
5,524,451 A 6/1996 Tippmann
5,603,229 A 2/1997 Cocchi et al.
5,644,926 A 7/1997 Kress
5,676,462 A 10/1997 Fraczek et al.
5,692,392 A 12/1997 Swier
5,706,720 A 1/1998 Goch et al.
5,735,602 A 4/1998 Salvatore
5,788,370 A 8/1998 Pedrazzi
5,799,726 A 9/1998 Frank
5,823,672 A 10/1998 Barker
5,906,105 A 5/1999 Ugolini
5,967,226 A 10/1999 Choi
6,010,035 A 1/2000 Estruch
6,055,900 A 5/2000 Bunn
6,058,721 A 5/2000 Midden et al.
6,070,417 A 6/2000 Benson
6,082,123 A 7/2000 Johnson
6,119,472 A 9/2000 Ross
6,176,090 B1 1/2001 Ufema
6,182,862 B1 2/2001 McGill
6,220,047 B1 4/2001 Vogel et al.
6,253,573 B1 7/2001 Schwitters et al.
6,264,066 B1 7/2001 Vincent et al.
6,301,918 B1 10/2001 Quartarone et al.
6,349,852 B1 2/2002 Ford
6,370,892 B1 4/2002 Ross
6,438,987 B1 8/2002 Pahl
6,490,872 B1 12/2002 Beck et al.
6,513,578 B2 2/2003 Frank
6,546,843 B2 4/2003 Ugolini
6,553,779 B1 4/2003 Boyer et al.
6,557,835 B2 5/2003 Dijk
6,619,056 B2 9/2003 Midden et al.
6,622,511 B2 9/2003 Ashworth et al.
6,637,214 B1 10/2003 Leitzke et al.
6,679,314 B2 1/2004 Frank
6,694,752 B2 2/2004 Nomura et al.
6,705,106 B1 3/2004 Cunha et al.
6,735,967 B1 5/2004 Bischel et al.
6,761,036 B2 7/2004 Teague et al.
6,766,650 B2 7/2004 Cunha et al.
6,772,675 B2 8/2004 Ervin
D495,915 S 9/2004 Cahen
6,808,305 B2 10/2004 Sharpe et al.
6,817,749 B2 11/2004 Saunders et al.
6,830,239 B1 12/2004 Weber et al.
6,863,916 B2 3/2005 Henriksen et al.
6,907,743 B2 6/2005 Cocchi et al.
6,918,258 B2 7/2005 Cunha et al.
6,923,010 B2 8/2005 Small et al.
6,932,503 B2 8/2005 Fallowes
6,948,327 B2 9/2005 Bischel et al.
7,028,607 B2 4/2006 Zweben
7,047,758 B2 5/2006 Ross
7,100,392 B2 9/2006 Cortese
7,152,765 B1 12/2006 Midden et al.
7,165,699 B2 1/2007 McGill
7,213,965 B2 5/2007 Daniels, Jr.
7,251,905 B2 8/2007 Doh et al.
7,264,187 B1 9/2007 Kolar
7,269,960 B2 9/2007 Elsom et al.
7,270,473 B2 9/2007 Donthnier et al.
7,275,666 B2 10/2007 Rukavina et al.
7,278,276 B2 10/2007 Boyer et al.
7,278,555 B2 10/2007 McGill
7,393,690 B2 7/2008 Sukavaneshvar et al.
7,451,613 B2 11/2008 Barraclough et al.
7,543,717 B2 6/2009 Hinkle

(56) References Cited

U.S. PATENT DOCUMENTS 7,547,135 B2 6/2009 Kocienski
7,587,972 B2 9/2009 Katz et al.
D601,846 S 10/2009 Rousselin et al.
7,603,870 B2 10/2009 Mavridis et al.
7,607,821 B2 10/2009 Schmidt
7,647,782 B2 1/2010 Bucceri
7,648,264 B2 1/2010 Breviere et al.
7,698,899 B2 4/2010 Lewitus et al.
7,712,321 B2 5/2010 Kadyk
7,712,951 B2 5/2010 Bohannon, Jr. et al.
7,726,136 B2 6/2010 Baxter et al.
7,754,266 B2 7/2010 Waletzko et al.
7,870,749 B2 1/2011 Franck et al.
7,878,702 B2 2/2011 Peng
7,908,871 B2 3/2011 Baxter et al.
7,942,094 B2 5/2011 Kounlavong et al.
7,976,883 B2 7/2011 Guerrero et al.
8,016,168 B2 9/2011 Goulet
8,123,075 B2 2/2012 Kadyk
8,157,435 B2 4/2012 Pryor, Jr.
8,289,514 B2 10/2012 Sukavaneshvar et al.
8,297,182 B2 10/2012 Cocchi et al.
8,323,015 B2 12/2012 Day et al.
8,434,319 B2 5/2013 Klier et al.
8,459,043 B2 6/2013 Bertone
8,479,532 B2 7/2013 Cocchi et al.
8,485,393 B2 7/2013 Van Zeeland
8,550,695 B2 10/2013 Conti
8,561,839 B2 10/2013 Cocchi et al.
8,572,998 B2 11/2013 Cocchi et al.
8,584,894 B1 11/2013 Mulvaney et al.
8,584,897 B2 11/2013 Belcham
8,591,097 B2 11/2013 Cocchi et al.
8,616,250 B2 12/2013 Herbert
8,685,477 B2 4/2014 Almblad et al.
8,701,435 B2 4/2014 Gist et al.
8,769,973 B2 7/2014 Leaver et al.
8,770,093 B2 7/2014 Cahen et al.
8,820,213 B2 9/2014 Lang et al.
8,876,366 B2 11/2014 Saubert
8,887,522 B2 11/2014 Grampassi
8,899,063 B2 12/2014 Ugolini
8,998,037 B2 4/2015 Cahen et al.
9,016,077 B2 4/2015 Cho et al.
9,066,529 B2 6/2015 Fassberg et al.
9,089,821 B2 7/2015 Seidler et al.
9,127,881 B2 9/2015 Anderson et al.
9,131,709 B2 9/2015 Hammonds et al.
9,198,536 B2 12/2015 Lardelli et al.
9,233,829 B2 1/2016 Grampassi
9,301,537 B2 4/2016 Cocchi et al.
9,302,233 B1 4/2016 Lowell
9,314,043 B2 4/2016 Grampassi
9,326,529 B2 5/2016 Sipp et al.
9,326,530 B2 5/2016 Ugolini
9,326,531 B1 5/2016 Reich et al.
9,328,948 B2 5/2016 Billman et al.
9,364,114 B2 6/2016 Claesson et al.
9,397,591 B2 7/2016 Hyde et al.
9,398,774 B2 7/2016 Grampassi
9,402,408 B2 8/2016 Cocchi et al.
9,408,495 B2 8/2016 Gugerli et al.
9,420,915 B2 8/2016 Dickson, Jr. et al.
9,457,386 B2 10/2016 Gates et al.
9,462,826 B2 10/2016 Cocchi et al.
9,474,410 B2 10/2016 Hudgins et al.
9,528,740 B1 12/2016 Gist et al.
9,565,868 B2 2/2017 D'Agostino
9,591,871 B2 3/2017 Ugolini
9,648,896 B2 5/2017 Ugolini
9,656,227 B2 5/2017 Paget
9,681,778 B2 6/2017 Pendleton et al.
9,723,857 B2 8/2017 Endo et al.
9,725,228 B2 8/2017 Py et al.
9,763,462 B2 9/2017 He et al.
9,765,891 B2 9/2017 Bischel
D801,112 S 10/2017 Struggl
9,833,109 B2 12/2017 Farrell et al.
9,845,982 B2 12/2017 Knatt
9,854,820 B2 1/2018 Cocchi et al.
9,867,387 B2 1/2018 Davis et al.
9,894,912 B2 2/2018 Jacobsen et al.
9,895,028 B2 2/2018 Gerard et al.
9,986,748 B2 6/2018 Lazzarini et al.
9,993,016 B1 6/2018 Dyer
10,004,250 B2 6/2018 Ugolini
10,039,297 B2 8/2018 Grampassi
10,039,298 B2 8/2018 Noth et al.
10,094,607 B2 10/2018 Broadbent
10,123,551 B2 11/2018 Beth Halachmi
10,137,032 B2 11/2018 Williamson et al.
10,151,523 B2 12/2018 Sadot et al.
10,159,270 B2 12/2018 Cocchi et al.
10,238,129 B2 3/2019 Cocchi et al.
10,306,905 B2 6/2019 Cocchi
10,306,906 B2 6/2019 Elsom et al.
10,321,700 B2 6/2019 Cocchi et al.
10,327,455 B2 6/2019 Gates
10,333,451 B2 6/2019 Ortmann
10,334,868 B2 7/2019 Fonte
10,357,131 B2 7/2019 Dickson, Jr. et al.
10,375,973 B2 8/2019 Noth et al.
10,405,562 B2 9/2019 Cocchi et al.
10,463,059 B2 11/2019 Bush
10,477,878 B2 11/2019 Cocchi et al.
10,492,513 B1 12/2019 Sullivan
10,548,336 B2 2/2020 Tuchrelo et al.
10,555,545 B2 2/2020 Bischel
10,570,897 B2 2/2020 Cocchi et al.
10,571,041 B2 2/2020 Bischel
10,588,330 B2 3/2020 Cocchi et al.
10,624,364 B2 4/2020 Cocchi et al.
10,638,774 B2 5/2020 Grampassi
10,645,947 B2 5/2020 Versteeg et al.
10,660,348 B2 5/2020 Cheung
10,660,349 B2 5/2020 Cocchi et al.
10,674,743 B2 6/2020 Ugolini
10,674,744 B2 6/2020 Cocchi et al.
10,712,063 B2 7/2020 Cobabe et al.
10,712,087 B2 7/2020 Cui et al.
10,712,094 B2 7/2020 Cocchi et al.
10,721,944 B2 7/2020 Dong et al.
10,736,336 B2 8/2020 Cocchi et al.
10,736,337 B2 8/2020 Seiler et al.
10,743,563 B2 8/2020 Mohammed et al.
10,788,246 B2 9/2020 Frank et al.
10,806,163 B2 10/2020 Dong et al.
10,856,697 B2 12/2020 Boozer et al.
10,865,459 B2 12/2020 Latva-Kokko
10,894,705 B2 1/2021 Cocchi et al.
10,952,455 B2 3/2021 Cocchi et al.
10,952,456 B2 3/2021 Cocchi et al.
11,027,300 B2 6/2021 Crossdale et al.
11,051,531 B2 7/2021 Cocchi et al.
11,064,715 B2 7/2021 Herbert et al.
11,118,841 B2 9/2021 Minard
11,122,816 B2 9/2021 Yang et al.
11,134,703 B2 10/2021 Cocchi et al.
11,140,911 B2 10/2021 Cocchi et al.
11,147,289 B2 10/2021 San Miguel et al.
11,154,074 B2 10/2021 Greenberg et al.
11,154,163 B1 10/2021 He et al.
11,185,091 B2 11/2021 Koehl et al.
11,187,443 B2 11/2021 Cocchi et al.
11,213,046 B2 1/2022 Cocchi et al.
11,219,328 B2 1/2022 Dees et al.
11,261,073 B2 3/2022 Showalter
11,278,040 B2 3/2022 Newton et al.
11,291,218 B2 4/2022 Soffientini et al.
11,337,549 B2 5/2022 Tuchrelo et al.
11,344,045 B2 5/2022 Tuchrelo et al.
11,399,552 B2 8/2022 Cocchi et al.
11,406,119 B2 8/2022 Cocchi et al.
11,412,757 B2 8/2022 Velez et al.

(56) References Cited

U.S. PATENT DOCUMENTS 11,412,884 B2 8/2022 Herbert et al.
D964,082 S 9/2022 De Gooijer
11,470,855 B2 10/2022 Fonte et al.
11,484,042 B2 11/2022 Cocchi et al.
11,490,635 B2 11/2022 Dong
11,497,228 B2 11/2022 Wadle et al.
11,503,841 B2 11/2022 Fonte et al.
11,510,421 B2 11/2022 Yifrach
11,519,650 B2 12/2022 Rupp
11,528,922 B2 12/2022 Beth Halachmi
RE49,350 E 1/2023 Barniol Gutierrez et al.
11,540,533 B2 1/2023 Cocchi et al.
11,571,006 B2 2/2023 Luca et al.
11,576,398 B2 2/2023 Tassi et al.
11,582,985 B2 2/2023 Cocchi et al.
11,590,466 B2 2/2023 Charopoulos et al.
11,627,747 B2 4/2023 Fonte et al.
11,634,312 B2 4/2023 Fonte et al.
11,643,321 B2 5/2023 Bush et al.
11,696,589 B2 7/2023 Cocchi et al.
11,751,582 B2 9/2023 Lazzarini et al.
11,758,920 B1 9/2023 Frank et al.
11,771,108 B2 10/2023 Lazzarini et al.
11,805,789 B2 11/2023 Springer et al.
11,963,638 B2 4/2024 Eissengarthen et al.
D1,059,928 S 2/2025 Wang
2001/0052239 A1 12/2001 Dorner
2002/0162339 A1 11/2002 Harrison et al.
2003/0000240 A1* 1/2003 Pahl ...................... A23G 9/163 62/342
2003/0080644 A1 5/2003 Nelson et al.
2003/0142581 A1 7/2003 Barton et al.
2003/0192325 A1 10/2003 Cocchi et al.
2003/0227817 A1 12/2003 Martel et al.
2004/0056053 A1 3/2004 Hollander et al.
2004/0187514 A1 9/2004 Franck et al.
2004/0226305 A1 11/2004 Grampassi
2006/0043088 A1 3/2006 Ancona et al.
2006/0044935 A1 3/2006 Benelli et al.
2006/0156754 A1 7/2006 Liu
2006/0169147 A1 8/2006 Cocchi et al.
2006/0169727 A1 8/2006 Cocchi et al.
2006/0196366 A1 9/2006 Jeuch
2006/0213903 A1 9/2006 Lin
2007/0119867 A1 5/2007 Nakato et al.
2007/0151101 A1 7/2007 Cocchi et al.
2008/0073376 A1 3/2008 Gist et al.
2008/0098765 A1 5/2008 Bond
2008/0149655 A1 6/2008 Gist et al.
2008/0173027 A1 7/2008 Kim et al.
2008/0202130 A1 8/2008 Kadyk
2008/0282722 A1 11/2008 Edmonds et al.
2009/0009042 A1 1/2009 Kim et al.
2009/0052143 A1 2/2009 Chiu
2009/0127295 A1 5/2009 Cocchi et al.
2009/0139257 A1 6/2009 Cocchi et al.
2010/0004109 A1 1/2010 Ballhause
2010/0050655 A1 3/2010 Bravo et al.
2010/0116846 A1 5/2010 Cortese et al.
2010/0147875 A1 6/2010 Santos et al.
2010/0293965 A1 11/2010 Frank et al.
2011/0101039 A1 5/2011 Cocchi et al.
2011/0262600 A1 10/2011 McGill
2011/0289947 A1 12/2011 Chadwell et al.
2012/0096876 A1 4/2012 Ravji et al.
2012/0223094 A1 9/2012 Rickard, Jr. et al.
2012/0285331 A1 11/2012 Mori et al.
2012/0298690 A1 11/2012 Skobel et al.
2012/0300954 A1 11/2012 Ku
2012/0312049 A1 12/2012 Downs, III et al.
2013/0077433 A1 3/2013 Conti
2013/0098098 A1 4/2013 Ugolini
2013/0152620 A1* 6/2013 Ugolini .................... A23G 9/12 62/426
2013/0263747 A1 10/2013 Ugolini
2013/0334262 A1 12/2013 Banning et al.
2014/0043931 A1 2/2014 Figueroa
2014/0134299 A1 5/2014 Guidorzi et al.
2014/0209635 A1 7/2014 Gates et al.
2014/0212566 A1 7/2014 Herbert et al.
2014/0246456 A1 9/2014 Huang
2014/0263340 A1 9/2014 Audette
2014/0263415 A1 9/2014 San Miguel et al.
2014/0319146 A1 10/2014 Ye et al.
2015/0150408 A1 6/2015 Schlee
2015/0191685 A1 7/2015 Kyle
2015/0245636 A1 9/2015 Forrester, Jr.
2015/0264959 A1 9/2015 Colwell et al.
2016/0015217 A1 1/2016 Rojas Restrepo et al.
2016/0016129 A1 1/2016 Vermeulen et al.
2016/0139604 A1 5/2016 Ito
2016/0157509 A1 6/2016 Cocchi
2016/0262422 A1 9/2016 Biglari et al.
2016/0353766 A1 12/2016 Jacobsen et al.
2017/0027188 A1 2/2017 Raybin et al.
2017/0030467 A1 2/2017 Versteeg et al.
2017/0160007 A1 6/2017 Liptak et al.
2017/0304784 A1 10/2017 Kasprzycki
2017/0332658 A1 11/2017 Mitchell et al.
2017/0367370 A1 12/2017 Frisque et al.
2018/0014553 A1 1/2018 Ugolini
2018/0020875 A1 1/2018 Kolar et al.
2018/0087827 A1 3/2018 Lee et al.
2018/0184682 A1 7/2018 Bertone
2018/0206519 A1 7/2018 Noth et al.
2018/0216875 A1 8/2018 Caswell et al.
2018/0228180 A1 8/2018 Cocchi et al.
2018/0231318 A1 8/2018 Cocchi et al.
2019/0056182 A1 2/2019 Bischel et al.
2019/0070643 A1 3/2019 Wong et al.
2019/0110496 A1 4/2019 Cocchi et al.
2019/0124944 A1 5/2019 Caiano
2019/0125122 A1 5/2019 Feola
2019/0166873 A1 6/2019 Grampassi
2019/0313664 A1 10/2019 Haas et al.
2019/0357562 A1 11/2019 San Miguel et al.
2020/0107559 A1 4/2020 Deshpande et al.
2020/0156019 A1 5/2020 Sawyer et al.
2020/0173697 A1 6/2020 Resnick
2020/0288746 A1 9/2020 Luca et al.
2020/0288747 A1 9/2020 Greenberg et al.
2020/0339407 A1 10/2020 Caiano
2020/0391990 A1 12/2020 Yamashita et al.
2021/0000133 A1 1/2021 Meldrum et al.
2021/0003549 A1 1/2021 Ino et al.
2021/0022364 A1 1/2021 Meldrum et al.
2021/0084930 A1 3/2021 Fonte
2021/0085129 A1 3/2021 Boozer et al.
2021/0152649 A1 5/2021 Ciepiel
2021/0161182 A1 6/2021 Stoenescu et al.
2021/0177211 A1 6/2021 Siu et al.
2021/0186267 A1 6/2021 Hammond et al.
2021/0251418 A1* 8/2021 Dussault ............... A47J 31/467
2021/0354100 A1 11/2021 Sapire et al.
2021/0360979 A1 11/2021 Leb et al.
2021/0368821 A1 12/2021 Tassi et al.
2021/0371265 A1 12/2021 Fonte et al.
2022/0001344 A1 1/2022 Zdanow et al.
2022/0030906 A1 2/2022 Springer et al.
2022/0073336 A1 3/2022 Savioz
2022/0087284 A1 3/2022 Savioz
2022/0110339 A1 4/2022 Beth Halachmi et al.
2022/0117255 A1 4/2022 Lazzarini et al.
2022/0117256 A1 4/2022 Wang
2022/0174978 A1 6/2022 Douer
2022/0205712 A1* 6/2022 Fonte ....................... A23G 9/22
2022/0211072 A1 7/2022 Tran et al.
2022/0225636 A1 7/2022 Minard et al.
2022/0240533 A1 8/2022 Dees et al.
2022/0257031 A1 8/2022 Veettil et al.
2022/0273141 A1 9/2022 Atinaja
2022/0295822 A1 9/2022 Lazzarini et al.
2022/0394996 A1 12/2022 Lazzarini et al.
2023/0000289 A1 1/2023 Kolar et al.

(56) References Cited

U.S. PATENT DOCUMENTS

| | | | |
|---|---|---|---|
| 2023/0038281 | A1 | 2/2023 | Gee, II et al. |
| 2023/0040750 | A1 | 2/2023 | Ciepiel et al. |
| 2023/0055322 | A1 | 2/2023 | Griffiths et al. |
| 2023/0074503 | A1 | 3/2023 | Kanellos et al. |
| 2023/0107530 | A1 | 4/2023 | Kadyk et al. |
| 2023/0180785 | A1 | 6/2023 | Feola |
| 2023/0292785 | A1 | 9/2023 | Collins et al. |
| 2023/0413851 | A1 | 12/2023 | Resnick et al. |
| 2024/0074453 | A1 | 3/2024 | Herbert et al. |
| 2024/0251821 | A1 | 8/2024 | Freebairn et al. |
| 2024/0292979 | A1 | 9/2024 | Weinstock et al. |
| 2024/0292980 | A1 | 9/2024 | Weinstock et al. |

FOREIGN PATENT DOCUMENTS

| | | | |
|---|---|---|---|
| CN | 3029700 | | 1/1995 |
| CN | 3032479 | | 6/1995 |
| CN | 2305134 | Y | 1/1999 |
| CN | 2317778 | Y | 5/1999 |
| CN | 2681650 | Y | 3/2005 |
| CN | 2719037 | Y | 8/2005 |
| CN | 200968762 | Y | 10/2007 |
| CN | 201085021 | Y | 7/2008 |
| CN | 100417354 | C | 9/2008 |
| CN | 100462498 | C | 2/2009 |
| CN | 301023332 | | 9/2009 |
| CN | 100584257 | C | 1/2010 |
| CN | 101035719 | B | 9/2010 |
| CN | 301366044 | S | 10/2010 |
| CN | 101897379 | A | 12/2010 |
| CN | 101933555 | A | 1/2011 |
| CN | 101953631 | A | 1/2011 |
| CN | 301472931 | S | 2/2011 |
| CN | 102118992 | A | 7/2011 |
| CN | 301716398 | S | 11/2011 |
| CN | 102395280 | A | 3/2012 |
| CN | 1981590 | B | 7/2012 |
| CN | 202287939 | U | 7/2012 |
| CN | 302035884 | S | 8/2012 |
| CN | 101073373 | B | 9/2012 |
| CN | 302156707 | S | 10/2012 |
| CN | 102791172 | A | 11/2012 |
| CN | 102869269 | A | 1/2013 |
| CN | 101433257 | B | 3/2013 |
| CN | 202773994 | U | 3/2013 |
| CN | 302432950 | S | 5/2013 |
| CN | 101263838 | B | 6/2013 |
| CN | 203194450 | U | 9/2013 |
| CN | 203207109 | U | 9/2013 |
| CN | 103649748 | A | 3/2014 |
| CN | 302768884 | S | 3/2014 |
| CN | 103732024 | A | 4/2014 |
| CN | 101842022 | B | 5/2014 |
| CN | 302912326 | S | 8/2014 |
| CN | 102802432 | B | 9/2014 |
| CN | 104222447 | A | 12/2014 |
| CN | 204047886 | U | 12/2014 |
| CN | 102791142 | B | 2/2015 |
| CN | 103052324 | B | 2/2015 |
| CN | 104351455 | A | 2/2015 |
| CN | 303162244 | S | 4/2015 |
| CN | 204467878 | U | 7/2015 |
| CN | 104839419 | A | 8/2015 |
| CN | 103727718 | B | 5/2016 |
| CN | 104146140 | B | 6/2016 |
| CN | 105685363 | A | 6/2016 |
| CN | 105767441 | A | 7/2016 |
| CN | 105876067 | A | 8/2016 |
| CN | 303857445 | S | 9/2016 |
| CN | 104349681 | B | 12/2016 |
| CN | 106472801 | A | 3/2017 |
| CN | 106472802 | A | 3/2017 |
| CN | 103619187 | B | 5/2017 |
| CN | 103796562 | B | 5/2017 |
| CN | 106720895 | A | 5/2017 |
| CN | 106720899 | A | 5/2017 |
| CN | 206137910 | U | 5/2017 |
| CN | 103190521 | B | 6/2017 |
| CN | 106900971 | A | 6/2017 |
| CN | 106998739 | A | 8/2017 |
| CN | 304230014 | S | 8/2017 |
| CN | 206480820 | U | 9/2017 |
| CN | 105636681 | B | 2/2018 |
| CN | 105928284 | B | 3/2018 |
| CN | 107799959 | A | 3/2018 |
| CN | 207531846 | U | 6/2018 |
| CN | 108471774 | A | 8/2018 |
| CN | 108473299 | A | 8/2018 |
| CN | 108967640 | A | 12/2018 |
| CN | 109068679 | A | 12/2018 |
| CN | 109152386 | A | 1/2019 |
| CN | 305030064 | S | 2/2019 |
| CN | 305037389 | S | 2/2019 |
| CN | 109497252 | A | 3/2019 |
| CN | 105979830 | B | 4/2019 |
| CN | 208724808 | U | 4/2019 |
| CN | 305125664 | S | 4/2019 |
| CN | 109952049 | A | 6/2019 |
| CN | 209034166 | U | 6/2019 |
| CN | 305238453 | S | 6/2019 |
| CN | 305239624 | S | 7/2019 |
| CN | 106414244 | B | 8/2019 |
| CN | 110168296 | A | 8/2019 |
| CN | 105142417 | B | 10/2019 |
| CN | 305404778 | S | 10/2019 |
| CN | 105517448 | B | 11/2019 |
| CN | 110432373 | A | 11/2019 |
| CN | 110477182 | A | 11/2019 |
| CN | 305442869 | S | 11/2019 |
| CN | 305442892 | S | 11/2019 |
| CN | 104782875 | B | 12/2019 |
| CN | 105992518 | B | 12/2019 |
| CN | 110547702 | A | 12/2019 |
| CN | 110573023 | A | 12/2019 |
| CN | 110604206 | A | 12/2019 |
| CN | 305488015 | S | 12/2019 |
| CN | 110678107 | A | 1/2020 |
| CN | 210092302 | U | 2/2020 |
| CN | 104543313 | B | 3/2020 |
| CN | 111011572 | A | 4/2020 |
| CN | 305701088 | S | 4/2020 |
| CN | 111096388 | A | 5/2020 |
| CN | 305830872 | S | 6/2020 |
| CN | 305830874 | S | 6/2020 |
| CN | 111386045 | A | 7/2020 |
| CN | 111465337 | A | 7/2020 |
| CN | 305908111 | S | 7/2020 |
| CN | 111887338 | A | 11/2020 |
| CN | 111903828 | A | 11/2020 |
| CN | 111918557 | A | 11/2020 |
| CN | 111918558 | A | 11/2020 |
| CN | 306204401 | S | 12/2020 |
| CN | 112155113 | A | 1/2021 |
| CN | 112262910 | A | 1/2021 |
| CN | 306282727 | S | 1/2021 |
| CN | 306305200 | S | 1/2021 |
| CN | 105767440 | B | 3/2021 |
| CN | 105795089 | B | 3/2021 |
| CN | 306415926 | S | 3/2021 |
| CN | 112638214 | A | 4/2021 |
| CN | 212872077 | U | 4/2021 |
| CN | 111609640 | B | 5/2021 |
| CN | 213095924 | U | 5/2021 |
| CN | 306516598 | S | 5/2021 |
| CN | 106562677 | B | 6/2021 |
| CN | 112911941 | A | 6/2021 |
| CN | 306651752 | S | 6/2021 |
| CN | 105028886 | B | 7/2021 |
| CN | 105580972 | B | 7/2021 |
| CN | 213663494 | U | 7/2021 |
| CN | 213995516 | U | 8/2021 |
| CN | 109689530 | B | 9/2021 |
| CN | 113382952 | A | 9/2021 |
| CN | 214223471 | U | 9/2021 |

(56) References Cited

FOREIGN PATENT DOCUMENTS

| | | | |
|---|---|---|---|
| CN | 214284224 | U | 9/2021 |
| CN | 306833593 | S | 9/2021 |
| CN | 106234750 | B | 10/2021 |
| CN | 107279447 | B | 10/2021 |
| CN | 113483505 | A | 10/2021 |
| CN | 214316889 | U | 10/2021 |
| CN | 214841943 | U | 11/2021 |
| CN | 306946279 | S | 11/2021 |
| CN | 113729494 | A | 12/2021 |
| CN | 113748301 | A | 12/2021 |
| CN | 113776237 | A | 12/2021 |
| CN | 215176200 | U | 12/2021 |
| CN | 113892544 | A | 1/2022 |
| CN | 113892551 | A | 1/2022 |
| CN | 113907172 | A | 1/2022 |
| CN | 113925109 | A | 1/2022 |
| CN | 114017963 | A | 2/2022 |
| CN | 114072624 | A | 2/2022 |
| CN | 216088684 | U | 3/2022 |
| CN | 111854249 | B | 4/2022 |
| CN | 216205431 | U | 4/2022 |
| CN | 307297544 | S | 4/2022 |
| CN | 108471775 | B | 5/2022 |
| CN | 114424796 | A | 5/2022 |
| CN | 114449928 | A | 5/2022 |
| CN | 111977198 | B | 6/2022 |
| CN | 114728780 | A | 7/2022 |
| CN | 114760847 | A | 7/2022 |
| CN | 114760848 | A | 7/2022 |
| CN | 216906702 | U | 7/2022 |
| CN | 114868828 | A | 8/2022 |
| CN | 114870688 | A | 8/2022 |
| CN | 217284664 | U | 8/2022 |
| CN | 115005314 | A | 9/2022 |
| CN | 307613129 | S | 10/2022 |
| CN | 115348822 | A | 11/2022 |
| CN | 115397250 | A | 11/2022 |
| CN | 108402274 | B | 12/2022 |
| CN | 218495421 | U | 2/2023 |
| CN | 109414034 | B | 3/2023 |
| CN | 109463523 | B | 3/2023 |
| CN | 218790281 | U | 4/2023 |
| CN | 218892950 | U | 4/2023 |
| CN | 219047235 | U | 5/2023 |
| CN | 107788200 | B | 6/2023 |
| CN | 109090329 | B | 6/2023 |
| CN | 219146674 | U | 6/2023 |
| CN | 219282746 | U | 6/2023 |
| CN | 110269127 | B | 7/2023 |
| CN | 116473154 | A | 7/2023 |
| CN | 219374430 | U | 7/2023 |
| CN | 113892548 | B | 8/2023 |
| CN | 113925107 | B | 8/2023 |
| CN | 113892544 | B | 9/2023 |
| CN | 113728208 | B | 10/2023 |
| CN | 114009573 | B | 10/2023 |
| CN | 114009574 | B | 10/2023 |
| CN | 219846092 | U | 10/2023 |
| CN | 219995441 | U | 11/2023 |
| CN | 117295920 | A | 12/2023 |
| CN | 220235933 | U | 12/2023 |
| CN | 220287817 | U | 1/2024 |
| CN | 308416570 | S | 1/2024 |
| CN | 308422196 | S | 1/2024 |
| CN | 117928143 | A | 4/2024 |
| CN | 117958344 | A | 5/2024 |
| CN | 221059481 | U | 6/2024 |
| CN | 308671658 | S | 6/2024 |
| CN | 118383446 | A | 7/2024 |
| CN | 118383447 | A | 7/2024 |
| CN | 118383448 | A | 7/2024 |
| CN | 308729489 | S | 7/2024 |
| CN | 118415268 | A | 8/2024 |
| CN | 118442732 | A | 8/2024 |
| CN | 118463436 | A | 8/2024 |
| CN | 118489792 | A | 8/2024 |
| CN | 118645963 | A | 9/2024 |
| CN | 221881850 | U | 10/2024 |
| CN | 118873002 | A | 11/2024 |
| CN | 118912748 | A | 11/2024 |
| CN | 118949740 | A | 11/2024 |
| CN | 119097039 | A | 12/2024 |
| CN | 119111683 | A | 12/2024 |
| CN | 222278939 | U | 12/2024 |
| CN | 119344398 | A | 1/2025 |
| DE | 1981857 | U | 3/1968 |
| DE | 2225460 | | 12/1973 |
| DE | 19701379 | | 6/1998 |
| DE | 102013015012 | A1 | 3/2015 |
| DE | 102016219197 | A1 | 4/2018 |
| DE | 202021105580 | U1 | 2/2022 |
| EM | 001766817 | | 10/2010 |
| EP | 0022090 | B1 | 9/1984 |
| EP | 0133844 | A1 | 3/1985 |
| EP | 0250245 | B1 | 3/1991 |
| EP | 0793535 | B1 | 6/1999 |
| EP | 0861597 | A3 | 11/1999 |
| EP | 0827480 | B1 | 9/2002 |
| EP | 0876765 | B1 | 10/2002 |
| EP | 0910269 | B1 | 10/2002 |
| EP | 1132007 | A3 | 9/2003 |
| EP | 0893070 | B1 | 9/2005 |
| EP | 1787526 | A1 | 5/2007 |
| EP | 1230882 | B1 | 6/2007 |
| EP | 1808622 | A1 | 7/2007 |
| EP | 1635682 | B1 | 8/2007 |
| EP | 1787524 | A3 | 11/2008 |
| EP | 1738652 | B1 | 5/2009 |
| EP | 2266416 | A1 | 12/2010 |
| EP | 2332450 | A1 | 6/2011 |
| EP | 1980156 | B1 | 6/2012 |
| EP | 2062481 | B1 | 6/2012 |
| EP | 2342997 | B1 | 6/2012 |
| EP | 2478774 | A1 | 7/2012 |
| EP | 2064957 | B1 | 1/2013 |
| EP | 2446750 | B1 | 1/2013 |
| EP | 2578119 | A1 | 4/2013 |
| EP | 2096967 | B1 | 9/2013 |
| EP | 2267340 | B1 | 3/2014 |
| EP | 2613643 | B1 | 4/2014 |
| EP | 2508080 | B1 | 5/2015 |
| EP | 2708169 | B1 | 6/2015 |
| EP | 2680708 | B1 | 1/2016 |
| EP | 2550869 | B1 | 2/2017 |
| EP | 2805620 | B1 | 2/2017 |
| EP | 2269469 | B1 | 4/2017 |
| EP | 2277386 | B1 | 4/2017 |
| EP | 2713765 | B1 | 8/2017 |
| EP | 2653808 | A3 | 1/2018 |
| EP | 2863777 | B1 | 6/2018 |
| EP | 3348516 | A1 | 7/2018 |
| EP | 3360422 | A1 | 8/2018 |
| EP | 3172970 | B1 | 1/2019 |
| EP | 3399865 | B1 | 7/2019 |
| EP | 3324804 | B1 | 3/2020 |
| EP | 3245430 | B1 | 5/2020 |
| EP | 3669661 | A1 | 6/2020 |
| EP | 3351113 | B1 | 12/2020 |
| EP | 3340844 | B1 | 10/2022 |
| EP | 3473950 | B1 | 3/2023 |
| EP | 3519347 | B1 | 3/2023 |
| EP | 3554252 | B1 | 5/2023 |
| EP | 3793416 | B1 | 5/2023 |
| EP | 3616528 | B1 | 7/2023 |
| FR | 1202961 | A | 1/1960 |
| FR | 2574253 | B1 | 2/1990 |
| FR | 2705550 | A1 | 12/1994 |
| GB | 1183551 | | 3/1970 |
| GB | 1367786 | A | 9/1974 |
| GB | 2424081 | A | 9/2006 |
| GB | 2444979 | B | 6/2008 |
| IT | 20100713 | A1 | 5/2012 |
| IT | 201900002923 | A1 | 8/2020 |
| JP | H06207768 | A | 7/1994 |

(56) References Cited

FOREIGN PATENT DOCUMENTS

| | | | |
|---|---|---|---|
| JP | H11113498 | A | 4/1999 |
| JP | H11299429 | A | 11/1999 |
| JP | 2001169730 | A | 6/2001 |
| JP | 2009149316 | A | 7/2009 |
| JP | 2010094175 | A | 4/2010 |
| JP | 2013102786 | A | 5/2013 |
| JP | 1510182 | S | 10/2014 |
| JP | 2014222404 | A | 11/2014 |
| JP | 1525793 | S | 6/2015 |
| JP | 2022035551 | A | 3/2022 |
| KR | 9761081 | A | 9/1997 |
| KR | 100214695 | B1 | 8/1999 |
| KR | 200303628 | Y1 | 2/2003 |
| KR | 300432449 | S | 12/2006 |
| KR | 300777160 | S | 12/2014 |
| KR | 1020180105925 | A | 10/2018 |
| KR | 102052851 | B1 | 12/2019 |
| KR | 1020200136121 | A | 12/2020 |
| TW | 161842 | S | 6/1991 |
| WO | 0125673 | A1 | 4/2001 |
| WO | 0197628 | A1 | 12/2001 |
| WO | 2004054380 | A1 | 7/2004 |
| WO | 2008001520 | A1 | 1/2008 |
| WO | 2008119980 | A1 | 10/2008 |
| WO | 2011081301 | A2 | 7/2011 |
| WO | 2014123842 | A1 | 8/2014 |
| WO | 2015063094 | A1 | 5/2015 |
| WO | 2016069106 | A1 | 5/2016 |
| WO | 2017072531 | A1 | 5/2017 |
| WO | 2019057130 | A1 | 3/2019 |
| WO | 2020163551 | A1 | 8/2020 |
| WO | 2020191221 | A1 | 9/2020 |
| WO | 2021009788 | A1 | 1/2021 |
| WO | 2021250682 | A1 | 12/2021 |
| WO | 2022205902 | A1 | 10/2022 |
| WO | 2023286000 | A1 | 1/2023 |
| WO | 2023042084 | A1 | 3/2023 |
| WO | 2023091416 | A3 | 5/2023 |
| WO | 2023131944 | A1 | 7/2023 |
| WO | WO2023248079 | A1 | 12/2023 |
| WO | 2024111011 | A1 | 5/2024 |
| WO | 2024250152 | A1 | 12/2024 |

OTHER PUBLICATIONS

Complaint for Declaratory Judgment, *Shenzhen Tao Yi An E-Commerce Co., Ltd.* v. *SharkNinja Operating LLC*, No. 5:25-cv-04656 (N.D. Cal. Jun. 3, 2025), 13 pages.

Defendants' answer to complaint and counterclaims, *Sharkninja Operating LLC*, v *The Individuals, Corporations, Limited liability companies, partnerships and unincorporated associations identified on schedule A*, Case No. 1:25-cv-25323, Doc. 239, Jan. 28, 2026.

Answer and Affirmative Defenses to Counterclaims, *Foshan Macjerry Technology Co., Ltd.* V. *SharkNinja Operating LLC*, No. 2:25-cv-00954 (W.D. Wash. Jul. 11, 2025).

Answer and Counterclaims to Plaintiffs Second Amended Complaint, *SharkNinja Operating LLC* et al. v. *RJ Brands, LLC*, No. 1:25-cv-05650 (D.N.J. Aug. 11, 2025).

Answer and Counterclaims, *SharkNinja Operating LLC* v. *RJ Brands, LLC*, No. 1:25-cv-05650 (D.N.J. Aug. 11, 2025).

Complaint for Declaratory Judgment, *Shenzhen SaLilan Technology Co., Ltd* et al v. *SharkNinja Operating LLC*, No. 1:25-cv-12447-WGY (D. Mass. Sep. 3, 2025).

Complaint, *SharkNinja Operating LLC* et al. v. *The Individuals, Corporations, Limited Liability Companies, Partnerships, and Unincorporated Associations Identified on Schedule A*, 2025, pp. 1-29, No. 1:25-cv-25323-RAR.

Defendants Opposition to Plaintiffs Motion for Entry of Preliminary Injunction, *SharkNinja Operating LLC* et al. v. *The Individuals, Corporations, Limited Liability Companies, Partnerships, and Unincorporated Associations Identified on Schedule A*, 2025, pp. 1-29, No. 1:25-cv-25323-RAR.

Exhibit Claim 1 Analysis, *SharkNinja Operating LLC* et al. v. *The Individuals, Corporations, Limited Liability Companies, Partnerships, and Unincorporated Associations Identified on Schedule A*, 2025, pp. 1-7, No. 1:25-cv-25323-RAR.

Exhibit I to Glacier Parties' Opposition to Plaintiffs' Motion for Preliminary Injunction, *SharkNinja Operating LLC* et al. v. *The Individuals, Corporations, Limited Liability Companies, Partnerships, and Unincorporated Associations Identified on Schedule A*, Jan. 15, 2026, No. 1:25-cv-25323-RAR, 73 pages.

Exhibit J to Glacier Parties' Opposition to Plaintiffs' Motion for Preliminary Injunction, *SharkNinja Operating LLC* et al. v. *The Individuals, Corporations, Limited Liability Companies, Partnerships, and Unincorporated Associations Identified on Schedule A*, Jan. 15, 2026, No. 1:25-cv-25323-RAR, 57 pages.

Exhibit K to Glacier Parties' Opposition to Plaintiffs' Motion for Preliminary Injunction, *SharkNinja Operating LLC* et al. v. *The Individuals, Corporations, Limited Liability Companies, Partnerships, and Unincorporated Associations Identified on Schedule A*, Jan. 15, 2026, No. 1:25-cv-25323-RAR, 47 pages.

Expedited Motion to Dissolve Temporary Restraining Order and Deny Preliminary Injunction, *SharkNinja Operating LLC* et al. v. *The Individuals, Corporations, Limited Liability Companies, Partnerships, and Unincorporated Associations Identified on Schedule A*, 2025, pp. 1-20, No. 1:25-cv-25323-RAR.

First Amended Complaint for Declaratory Judgment, *Shenzhen SaLilan Technology Co., Ltd* et al v. *SharkNinja Operating LLC*, No. 1:25-cv-12447-WGY (D. Mass. Sep. 3, 2025).

Glacier Parties' Opposition to Plaintiffs' Motion for Preliminary Injunction, *SharkNinja Operating LLC* et al. v. *The Individuals, Corporations, Limited Liability Companies, Partnerships, and Unincorporated Associations Identified on Schedule A*, Jan. 15, 2026, No. 1:25-cv-25323-RAR, 37 pages.

Limited Opposition to Plaintiffs Motion for Entry of Preliminary Injunction, *SharkNinja Operating LLC* et al. v. *The Individuals, Corporations, Limited Liability Companies, Partnerships, and Unincorporated Associations Identified on Schedule A*, 2025, pp. 1-12, No. 1:25-cv-25323-RAR.

Motion to Dissolve Ex Parte Tro and Opposition to Plaintiffs Motion for Entry of Preliminary Injunction, *SharkNinja Operating LLC* et al. v. *The Individuals, Corporations, Limited Liability Companies, Partnerships, and Unincorporated Associations Identified on Schedule A*, 2025, pp. 1-13, No. 1:25-cv-25323-RAR.

Omnibus Reply in Support of the Motion for Entry of Preliminary Injunction, *SharkNinja Operating LLC* et al. v. *The Individuals, Corporations, Limited Liability Companies, Partnerships, and Unincorporated Associations Identified on Schedule A*, 2025, pp. 1-44, No. 1:25-cv-25323-RAR.

Order Dissolving Temporary Restraining Order and Referring Case to Magistrate Judge, *SharkNinja Operating LLC* et al. v. *The Individuals, Corporations, Limited Liability Companies, Partnerships, and Unincorporated Associations Identified on Schedule A*, 2025, pp. 1-29, No. 1:25-cv-25323-RAR.

Shenzhen Fengkai E-commerco Co., Ltd. and Hong Kong Huayun Economic & Trade Co., Ltd. Defendants Opposition to Plaintiffs Motion for Entry of Preliminary Injunction, *SharkNinja Operating LLC* et al. v. *The Individuals, Corporations, Limited Liability Companies, Partnerships, and Unincorporated Associations Identified on Schedule A*, 2025, pp. 1-29, No. 1:25-cv-25323-RAR.

Xu Defendants' Opposition to Plaintiffs Motion for Preliminary Injunction, *SharkNinja Operating LLC* et al. v. *The Individuals, Corporations, Limited Liability Companies, Partnerships, and Unincorporated Associations Identified on Schedule A*, 2025, pp. 1-29, No. 1:25-cv-25323-RAR.

Crathco I-Pro Slush Machine, R290, R452a, R449, Dec. 2023, 52 pages.

Defendant RjJBrands, Llc's Invalidity and Non-Infringement Contentions, *SharkNinja Operating LLC* v. *RJ Brands, LLC*, No. 1:25-cv-05650, (D.N.J. Apr. 9, 2026), 58 pages.

Exhibit A1—Claim Chart U.S. Appl. No. 12/279,629, *Sharkninja Operating LLC* v. *RJ Brands, LLC d/b/a CHEFMAN* District of New Jersey No. 25-cv-05650, 115 pages.

(56) References Cited

OTHER PUBLICATIONS

Exhibit A2—Claim Chart U.S. Appl. No. 12/279,629, *Sharkninja Operating LLC* v. *RJ Brands, LLC d/b/a CHEFMAN* District of New Jersey No. 25-cv-05650, 114 pages.
Exhibit B1—Claim Chart U.S. Appl. No. 12/285,028, *Sharkninja Operating LLC* v. *RJ Brands, LLC d/b/a CHEFMAN* District of New Jersey No. 25-cv-05650, 31 pages.
Exhibit B2—Claim Chart U.S. Appl. No. 12/285,028, *Sharkninja Operating LLC* v. *RJ Brands, LLC d/b/a CHEFMAN* District of New Jersey No. 25-cv-05650, 49 pages.
Exhibit B3—Claim Chart U.S. Appl. No. 12/285,028, *Sharkninja Operating LLC* v. *RJ Brands, LLC d/b/a CHEFMAN* District of New Jersey No. 25-cv-05650, 52 pages.
Exhibit B4—Claim Chart U.S. Appl. No. 12/285,028, *Sharkninja Operating LLC* v. *RJ Brands, LLC d/b/a CHEFMAN* District of New Jersey No. 25-cv-05650, 29 pages.
Exhibit B5—Claim Chart U.S. Appl. No. 12/285,028, *Sharkninja Operating LLC* v. *RJ Brands, LLC d/b/a CHEFMAN* District of New Jersey No. 25-cv-05650, 61 pages.
Exhibit B6—Claim Chart U.S. Appl. No. 12/285,028, *Sharkninja Operating LLC* v. *RJ Brands, LLC d/b/a CHEFMAN* District of New Jersey No. 25-cv-05650, 54 pages.
Exhibit B7—Claim Chart U.S. Appl. No. 12/285,028, *Sharkninja Operating LLC* v. *RJ Brands, LLC d/b/a CHEFMAN* District of New Jersey No. 25-cv-05650, 61 pages.
Exhibit C1—Claim Chart Design U.S. Pat. No. 1,076,580, *Sharkninja Operating LLC* v. *RJ Brands, LLC d/b/a CHEFMAN* District of New Jersey No. 25-cv-05650, 72 pages.
Exhibit C2—Claim Chart U.S. Pat. No. 1,076,580, *Sharkninja Operating LLC* v. *RJ Brands, LLC d/b/a CHEFMAN* District of New Jersey No. 25-cv-05650, 9 pages.
Exhibit D1—Claim Chart U.S. Appl. No. 12/446,594, *Sharkninja Operating LLC* v. *RJ Brands, LLC d/b/a CHEFMAN* District of New Jersey No. 25-cv-05650, 51 pages.
Exhibit D2—Claim Chart U.S. Appl. No. 12/446,594, *Sharkninja Operating LLC* v. *RJ Brands, LLC d/b/a CHEFMAN* District of New Jersey No. 25-cv-05650, 40 pages.
Exhibit D3—Claim Chart U.S. Appl. No. 12/446,594, *Sharkninja Operating LLC* v. *RJ Brands, LLC d/b/a CHEFMAN* District of New Jersey No. 25-cv-05650, 38 pages.
Exhibit D4—Claim Chart U.S. Appl. No. 12/446,594, *Sharkninja Operating LLC* v. *RJ Brands, LLC d/b/a CHEFMAN* District of New Jersey No. 25-cv-05650, 76 pages.
Exhibit D5—Claim Chart U.S. Appl. No. 12/446,594, *Sharkninja Operating LLC* v. *RJ Brands, LLC d/b/a CHEFMAN* District of New Jersey No. 25-cv-05650, 25 pages.
Exhibit D6—Claim Chart U.S. Appl. No. 12/446,594, *Sharkninja Operating LLC* v. *RJ Brands, LLC d/b/a CHEFMAN* District of New Jersey No. 25-cv-05650, 50 pages.
Exhibit D7—Claim Chart U.S. Appl. No. 12/446,594, *Sharkninja Operating LLC* v. *RJ Brands, LLC d/b/a CHEFMAN* District of New Jersey No. 25-cv-05650, 127 pages.
Exhibit D8—Claim Chart U.S. Appl. No. 12/446,594, *Sharkninja Operating LLC* v. *RJ Brands, LLC d/b/a CHEFMAN* District of New Jersey No. 25-cv-05650, 83 pages.
Exhibit E1—U.S. Pat. No. 12,279,629—RJ Brands Response and Basis Of Non-Infringement Contention, *Sharkninja Operating LLC* v. *RJ Brands, LLC d/b/a CHEFMAN* District of New Jersey No. 25-cv-05650, 4 pages.
Exhibit E2—U.S. Pat. No. 12,285,028—RJ Brands Response and Basis Of Non-Infringement Contention, *Sharkninja Operating LLC* v. *RJ Brands, LLC d/b/a CHEFMAN* District of New Jersey No. 25-cv-05650, 5 pages.
Exhibit E3—U.S. Design Pat. No. 1,076,580—RJ Brands Response and Basis Of Non-Infringement Contention, *Sharkninja Operating LLC* v. *RJ Brands, LLC d/b/a CHEFMAN* District of New Jersey No. 25-cv-05650, 4 pages.
Exhibit E4—U.S. Pat. No. 12,446,594—RJ Brands Response and Basis Of Non-Infringement Contention, *Sharkninja Operating LLC* v. *RJ Brands, LLC d/b/a CHEFMAN* District of New Jersey No. 25-cv-05650, 3 pages.
Part No. SL320003441, https://web.archive.org/web/20210419164854/https://www.snowshock.com/products/sl320003441-regular-auger-spiral-spin-16/, Feb. 16, 2026, 6 pages.
Yu Defendant's Answer, Affirmative Defenses, and Counterclaims to Plaintiff's Consolidated Complaint, *SharkNinja Operating LLC et al.* v. *The Individuals, Corporations, Limited Liability Companies, Partnerships, And Unincorporated Associations* Identified on Schedule A, (S.D. FL. 2026) Case No. 1:26-cv-23083-RAR-LFL, 85 pages.
Amazon Ninja Slushi Twist, amazon.com, First available date Jun. 27, 2026 Retrieved from the internet Jul. 1, 2026<https://www.amazon.com/dp/B0H42H6WS4?I (Year: 2026), 5 pages.
CNET Ninja Slushi Twist, cnet.com, First available date May 20, 2026 Retrieved from the internet Jul. 2, 2026<https://www.cnet.com/home/kitchen-and-household/ninja-slushie-twist-summer-drinks/ (Year: 2026), 9 pages.
Exhibit A, Invalidity Analysis of Asserted Claims 24 and 30 Of U.S. Pat. No. 12,593,855 B2, to Yu Defendants' Response in Opposition To Plaintiffs' Motion for Preliminary Injunction, *SharkNinja Operating LLC et al.* v. *The Individuals, Corporations, Limited Liability Companies, Partnerships, And Unincorporated Associations* Identified on Schedule A, (S.D. FL. 2026) Case No. 1:26-cv-23083-RAR-LFL, 11 pages.
Wired Ninja Slushi Twist, wired.com, First available date Jun. 30, 2026 Retrieved from the internet Jul. 1, 2026<https://www.wired.com/gallery/best-slushie-machines/ (Year: 2026), 23 pages.
Yu Defendants' Invalidity Analysis of Asserted Claims 24 and30 Of U.S. Pat. No. 12,593,855 B2 in Response To Plaintiffs' Renewed Preliminary Injunction Motion ECFNo. 58 (The •Refiled Exhibit 1 To ECF No. 67), 17 pages.
Yu Defendants' Response in Opposition To Plaintiffs' Motion for Preliminary Injunction *SharkNinja Operating LLC et al.* v. *The Individuals, Corporations, Limited Liability Companies, Partnerships, And Unincorporated Associations* Identified on Schedule A, (S.D. Fl. 2026) Case No. 1:26-cv-23083-RAR-LFL, 21 pages.

* cited by examiner

DUAL-USE COOLING FAN FOR DRINK MAKER

REFERENCE TO RELATED APPLICATIONS

This application is a continuation application of U.S. patent application Ser. No. 18/424,536, filed on Jan. 26, 2024, entitled DUAL-USE COOLING FAN FOR DRINK MAKER, which is a continuation-in-part of U.S. patent application Ser. No. 18/415,817, filed on Jan. 18, 2024, the entire contents of which are incorporated herein by reference.

TECHNICAL FIELD

The present disclosure relates to drink makers and, more particularly, to cooling components of a drink maker.

BACKGROUND

Frozen drink makers, which may also be referred to as semi-frozen beverage makers or crushed-ice drink makers, typically include a transparent tank or mixing vessel in which a drink product is received and processed, including being cooled, often transforming the drink product from a pure liquid (or a combination of a liquid and portions of ice) to a frozen or semi-frozen product, such as, for example, a granita, slush drink, smoothie, ice cream, or other frozen or semi-frozen product, which is then dispensed. The cooled product is typically dispensed through a tap, spigot or dispenser located at the front and near the bottom of the vessel. Thus, the term "frozen drink maker" as used herein is not limited to a device that only makes drinks or frozen drinks, but includes devices that cool received drink products to produce cooled outputs in any of a variety of cooled, frozen and semi-frozen forms. A drink product typically consists of a mixture of water or milk, a syrup, flavoring powders, or other additives that give the drink product the desired taste and color.

Some existing frozen drink makers include a mixing system within the mixing vessel having a mixing blade or auger that is rotated by a motor via a drive shaft and drive assembly. Some existing frozen drink makers include a refrigeration system having a compressor, a condenser and an evaporator (i.e., chiller) for receiving refrigerant from the compressor where the evaporator is located adjacent to or within the mixing vessel to cool the drink product during processing.

Some existing frozen drink makers include a controller that controls operations of the frozen drink maker related to making frozen drink products. Existing frozen drink makers may include computer-controlled programs that control the temperature of frozen food products during processing. Existing frozen drink makers typically include a drive motor with a fan affixed to a drive shaft of the drive motor that provides cooling to the drive motor and a separate condenser fan that provides cooling for the condenser.

SUMMARY

The application, in various implementations, addresses deficiencies associated with cooling components of a drink maker.

This application describes illustrative systems, methods, and devices whereby a dual-use cooling fan concurrently provides cooling air flow to both a drive motor used to drive rotation of a dasher and a condenser used to cool refrigerant of a refrigeration circuit and/or system of the drink maker.

In one aspect, a drink maker includes a mixing vessel arranged to receive a drink product and a dasher, driven by a drive motor, arranged to mix the drink product within the mixing vessel. A refrigeration circuit is arranged to cool the drink product within the mixing vessel including a condenser. A cooling fan is configured to concurrently cool the drive motor and the condenser. In some implementations, the cooling fan is driven by the drive motor either directly or via a gear assembly, and therefore is activated when the drive motor is activated.

The cooling fan may provide air flow through the condenser to cool refrigerant flowing through the condenser. The cooling fan may provide air flow along a surface of the drive motor to cool the drive motor. The cooling fan, drive motor, and condenser may be positioned such that air flow generated by the cooling fan passes serially through the condenser and along a surface of the drive motor. A first portion of air flow generated by the cooling fan may cool the condenser and a second portion of air flow generated by the cooling fan may cool the drive motor. In another implementation, air flow generated by the cooling fan passes in parallel through the condenser and along a surface of the drive motor such that a first portion of the air flow passes through the condenser, while a second portion of the air flow passes along a surface of the drive motor. The condenser may include one or more coils wound in a serpentine arrangement. Each of the one or more coils may include a plurality of thermal transfer fins. When the cooling fan provides air flow through the condenser to cool refrigerant flowing through the condenser, the air flow may travel adjacent to and/or around the plurality of coils.

A cooling channel may extend between the cooling fan and the drive motor, where the cooling channel provides cooling air flow between the cooling fan and the drive motor. The cooling channel may be at least partially formed by a duct. A cooling channel may extend between the cooling fan and the condenser, where the cooling channel provides cooling air flow between the cooling fan and the condenser. The cooling channel may be at least partially formed by a duct. The cooling may include a centrifugal fan, a cross-flow fan, a tangential fan, a volute fan, a backward curved fan, a forward curved fan, a blower fan, a squirrel-cage fan, and/or an axial fan.

In another aspect, a cooling fan is configured for cooling a drive motor and a condenser within a housing of a drink maker, where the drive motor is configured to drive rotation of a dasher within a mixing vessel of the drink maker and the condenser is configured to cool a refrigerant circulating within a refrigeration system of the drink maker. The cooling fan includes an air inlet configured to receive an air flow from the ambient environment, an impeller configured to generate the air flow, and an air outlet configured to output the air flow through the condenser and along a surface of the drive motor. The cooling fan may include an air channel arranged to direct the air flow through the condenser and along the surface of the drive motor. The air channel may be at least partially formed by an air duct. The cooling fan may include a centrifugal fan, a cross-flow fan, a tangential fan, a volute fan, a backward curved fan, a forward curved fan, a blower fan, a squirrel-cage fan, and/or an axial fan.

In a further aspect, a method for concurrently cooling a condenser and a drive motor within a housing of a drink maker using a cooling fan includes: activating the drive motor that is arranged to drive rotation of a dasher within a mixing vessel of the drink maker; activating a compressor of a refrigeration system of the drink maker; and activating the cooling fan to concurrently generate air flow through the condenser and along a surface of the drive motor. In some implementations, the cooling fan is coupled to and/or driven to rotate by the drive motor. The method may include receiving a user input to activate the drive motor, compressor, and the cooling fan. The user input may initiate a recipe and/or computer program, controlled by a controller, that automatically activates the drive motor, compressor, and the cooling fan.

One of ordinary skill will recognize that the systems, methods, and devices described herein may apply to other types of food products such as to the making and/or processing of, without limitation, ice cream, frozen yogurt, other creams, and the like. While the present disclosure describes examples of a drink maker processing various frozen and/or semi-frozen drink products, the systems, devices, and methods described herein are not limited to such drink products and are capable of processing and/or making other types of drink products such as cooled drink products and/or chilled drink products. The terms "mix," "mixed" or "mixing" as used herein are not limited to combining multiple ingredients together, but also include mixing a drink product or liquid having a single or no added ingredients. For example, a drink product may consist of only water that is mixed by a dasher during processing, i.e., portions of the water are churned and/or intermingled as the dasher rotates. This may, for example, advantageously enable a more uniform temperature of the water and/or liquid as a whole within the mixing vessel by intermingling portions of the water and/or liquid having different temperatures.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

Figure 1:
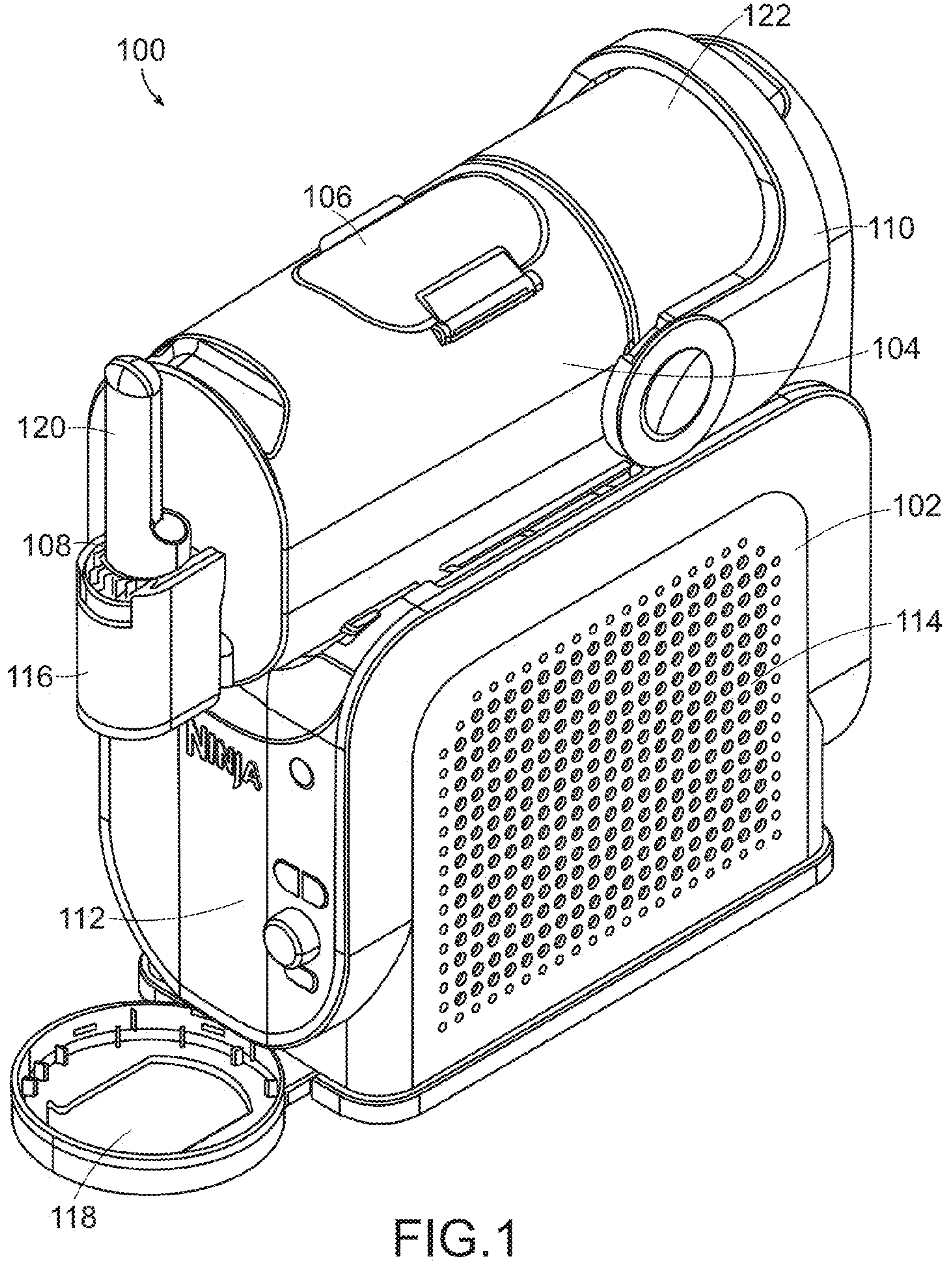
FIG. 1 shows a perspective view of a drink maker according to an implementation of the disclosure.

In the following description, like components have the same reference numerals, regardless of different illustrated implementations. To illustrate implementations clearly and concisely, the drawings may not necessarily reflect appropriate scale and may have certain structures shown in somewhat schematic form. The disclosure may describe and/or illustrate structures in one implementation, and in the same way or in a similar way in one or more other implementations, and/or combined with or instead of the structures of the other implementations.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the disclosure in any manner.

Certain aspects of the present disclosure include systems, methods, and devices that address a need for more efficient cooling of components within a drink maker and/or frozen drink maker.

FIG. 1 shows a perspective view of a drink maker 100 according to an illustrative implementation of the disclosure. The drink maker 100 includes a housing 102 and mixing vessel 104. The housing 102 may include user interface 112 for receiving user inputs to control frozen drink maker 100 and/or to output or display information. User interface 112 may include one or more buttons, dials, switches, touchscreens, indicators, LEDs, and the like. User interface 112 may display status information including for example, a temperature of a drink product within mixing vessel 104, an indicator of a recipe and/or program currently being implemented, a timer associated with the progress of a recipe and/or program in progress and/or currently being implemented. User interface 112 may provide indicators and/or warnings to users regarding, for example, when a recipe is complete or when a user is expected to perform an action associated with processing a drink product. User interface 112 may include a selectable menu of recipes and/or programs for different types of drink products such as, without limitation, granita, slush drink, smoothie, margarita, daiquiri, pina colada, slushi, cool drink, semi-frozen drink, frozen drink, and the like.

Housing 102 may include a removable panel 114 along a side of the housing 102. Panel 114 may include a plurality of openings that facilitate air flow to aid in cooling components within housing 102. Housing 102 may include upper housing section 122 that is arranged to couple with a rear end of mixing vessel 104 when mixing vessel 104 is attached to housing 102. Mixing vessel 104 may include walls, or a portion thereof, that are transparent to enable a viewer to see a drink product within mixing vessel 104 during processing. Mixing vessel 104 may include pour-in opening 106 whereby mixing vessel 104 can receive ingredients for processing a drink product within mixing vessel 104. FIG. 1 shows pour-in opening 106 in a closed configuration with a cover sealing opening 106. The cover may be detachably removable or moveable to open or close opening 106. Pour-in opening 106 may include a grate to inhibit a user from reaching into mixing vessel 104 when pour-in opening 106 is open, i.e., the cover is not installed. Mixing vessel 104 may include a dispenser assembly 108 having a user handle 120, a spout (not shown), and a spout shroud and/or cover 116. Dispenser assembly 108 enables a user, by pulling down on handle 120, to open a spout, connected to a wall of mixing vessel 104, to dispense drink product from mixing vessel 104. The user can close the spout by pushing handle 120 back to its upright position (shown in FIG. 1) and, thereby, stop the dispensing of the drink product.

Frozen drink maker and/or drink maker 100 may include a lever 110 that enables a locked coupling of mixing vessel 104 to housing 102 including upper housing section 122. FIG. 1 shows lever 110 in the locked and/or closed position whereby mixing vessel 104 is engaged and/or coupled to housing 102 and upper housing section 122. In the closed and/or engaged position, lever 110 ensures that there is a water-tight seal to prevent leakage of the drink product from mixing vessel 104. Lever 110 may be placed in the closed, coupled, and/or engaged position by sliding mixing vessel 104 against upper housing section 122 and then rotating lever 110 in a clockwise direction until its handle rests on or about the top surface of upper housing section 122. Mixing vessel 104 can be disengaged and/or decoupled from housing 102 and upper housing section 122 by pulling and/or rotating lever 110 in a counter-clockwise direction toward the front of mixing vessel 104, which causes lever 110 to release mixing vessel 104. Once released, mixing vessel 104 may slide in a forward direction (away from upper housing section 122) to be fully detached and/or removed from housing 102. Frozen drink maker 100 may also include water tray 118 being positioned below dispenser assembly 108 and arranged to collect any drink product that is not properly dispensed from mixing vessel 104 to, for example, a user cup.

Figure 2:
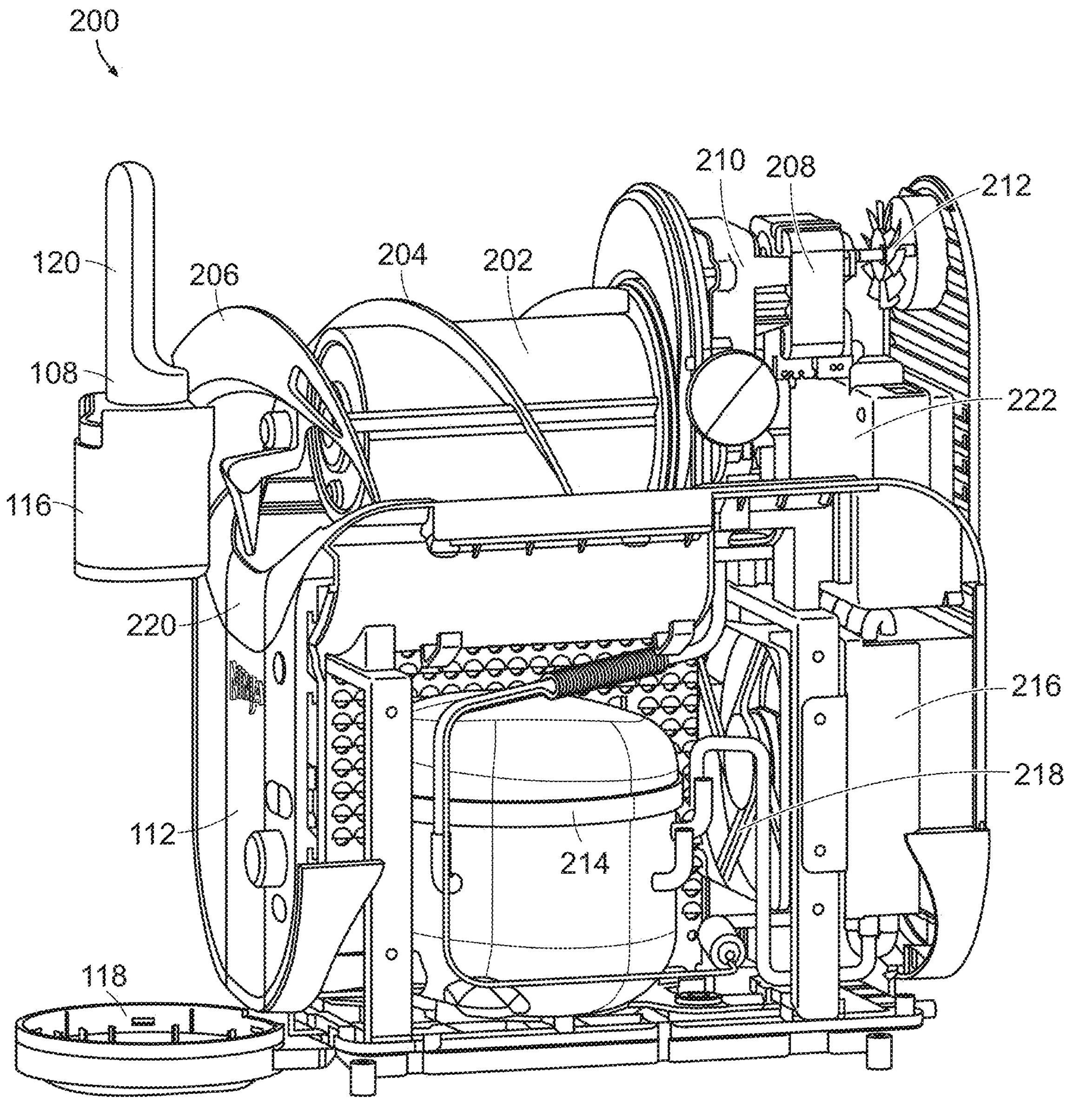
FIG. 2 shows a view of various internal components within the housing and mixing vessel of the drink maker of FIG. 1 according to an implementation of the disclosure.

FIG. 2 shows a view 200 of various internal components within housing 102 and mixing vessel 104 of drink maker 100 of FIG. 1. Drink maker 100 includes a cylindrical evaporator 202 that is surrounded by an auger and/or dasher 204. Dasher 204 may include one or more mixing blades and/or protrusions that extend helically around evaporator and/or chiller 202. Dasher 204 may be driven to rotate by a central drive shaft within mixing vessel 104. The drive shaft may be surrounded by evaporator 202. However, in various implementations, evaporator 202 does not rotate. The drive shaft may be coupled via a gear assembly 210 to a drive motor 208. In some implementations, drive motor 208 is an AC motor, but another type of motor may be used such as, without limitation, a DC motor. Drive motor 208 may include a motor fan 212 arranged to provide air cooling for motor 208. While FIG. 2 shows an implementation where drive motor 208 is not coaxially aligned with the drive shaft used to rotate dasher 204, in other implementations, motor 208 can be aligned coaxially with the drive shaft. During processing of a drink product, motor 208 may be continuously operated at a one or more speeds to drive continuous rotation of dasher 204 and, thereby, provide continuous mixing of the drink product within mixing vessel 104. In some implementation, the rotation of the dasher 204 causes the helically arranged blades to push the cooling drink product to the front of the mixing vessel 104. During the processing, portions of the drink product may freeze against the surface of the evaporator as a result of being cooled by the evaporator. In some implementations, the blades of the rotating dasher 204 scrape frozen portions of the drink product from the surface the evaporator while concurrently mixing and pushing the cooling drink product towards the front of the mixing vessel 104. Water tray 118 may be attachably removable from it operational position shown in FIG. 1. For example, water tray 118 may mounted and/or stored on a side panel of housing 102 as illustrated in FIG. 3 as water tray 304.

Frozen drink maker 100 may include a refrigeration and/or cooling system to provide cooling of a drink product and/or to control the temperature of a drink product within mixing vessel 104. The refrigeration and or cooling system may include a compressor 214, an evaporator 202, a condenser 216, a condenser fan 218, a bypass valve, and conduit that carries refrigerant in a closed loop among the refrigeration system components to facility cooling and/or temperature control of a drink product in mixing vessel 104. Operations of the refrigeration system may be controlled by a controller, such as controller 402, as described further with respect to FIG. 4 later herein. Frozen drink maker 100 may also include a condensation collection tray 220 arranged to collect any liquid condensation caused by cooling from evaporator 202. FIG. 2 shows tray 220 in the inserted position. Tray 220 may be insertably-removable from a slot within housing 102 to enable collection of condensed liquid when inserted into the slot and then efficient removal to empty tray 220, and then re-insertion into the slot for subsequent liquid collection.

Figure 3:
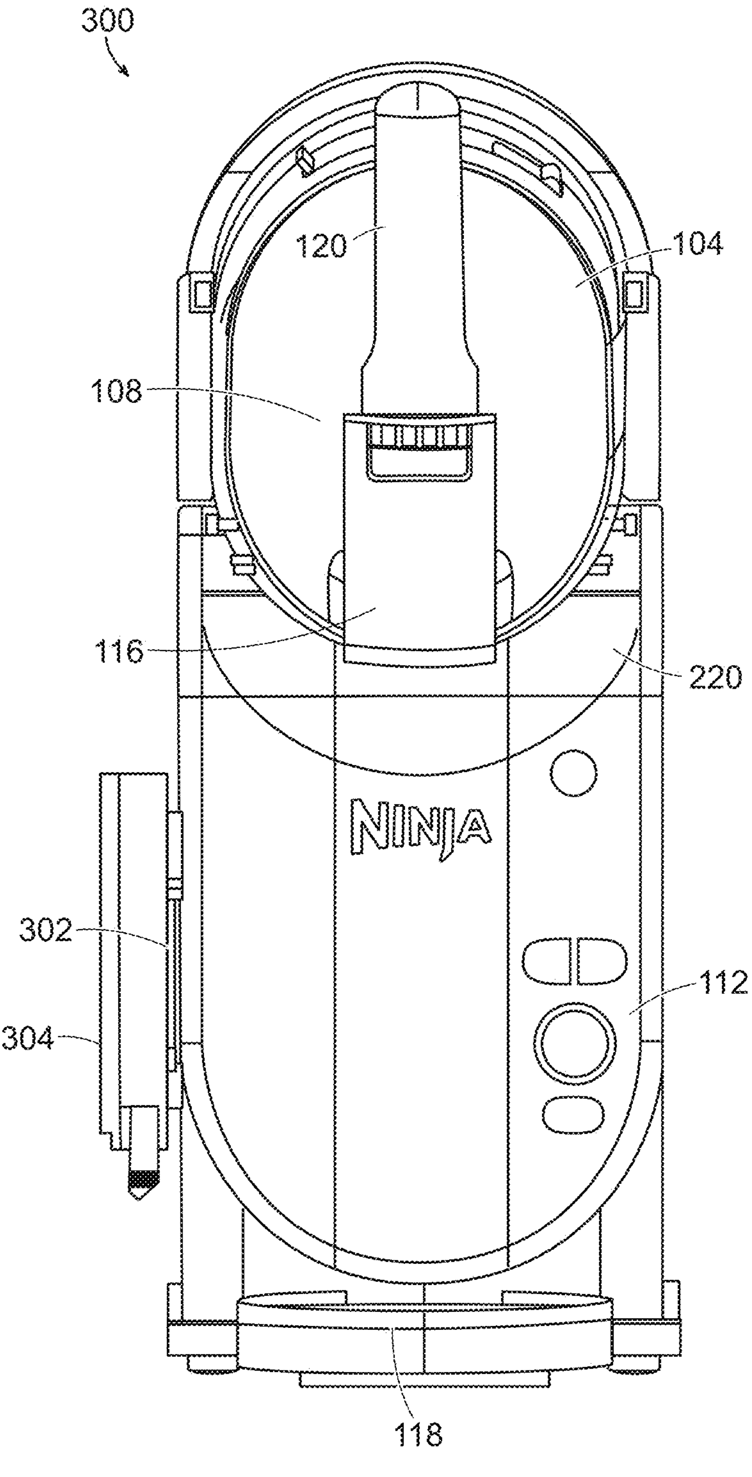
FIG. 3 shows a front view of the drink maker of FIG. 1 according to some implementations of the disclosure.

FIG. 3 shows a front view 300 of frozen drink maker 100 of FIG. 1. Frozen drink maker 100 may include user interface 112 on a front surface of housing 102. In other implementations, user interface 112 may be located on a side, top, or back of housing 102. Frozen drink maker 100 may include a power interface (not shown) arranged to receive AC power from a power outlet. In some implementations, frozen drink maker 100 may include one or more batteries housed within housing 102 and arranged to provide power to various components of frozen drink maker 100. Frozen drink maker 100 may also include a printed circuit board (PCB) 222 within housing 102. Frozen drink maker may include a mount 302 on a side of housing 102 where water tray 118 can be mounted when not in use (shown as water tray 304 in FIG. 3) such as during transport of frozen drink maker 100. As will be explained with respect to FIG. 4, PCB 222 may include a control system 400 arranged to automatically control certain operations of frozen drink maker 100.

Figure 4:
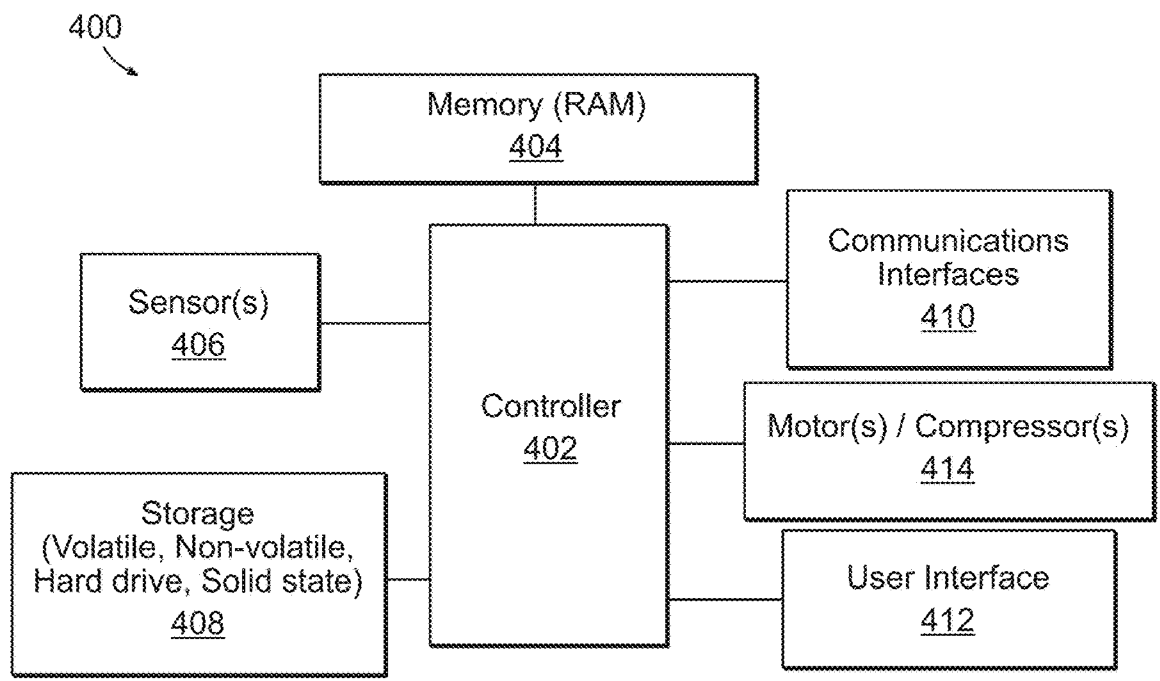
FIG. 4 is a block diagram of an example of a control system of the drink maker of FIG. 1, according to some implementations of the disclosure.

FIG. 4 is a block diagram of an exemplary control system 400 of frozen drink maker 100 according to some implementations of the disclosure. Control system 400 may include a microcontroller, a processor, a system-on-a-chip (SoC), a client device, and/or a physical computing device and may include hardware and/or virtual processor(s). In some implementations, control system 400 and its elements as shown in FIG. 4 each relate to physical hardware, while in some implementations one, more, or all of the elements could be implemented using emulators or virtual machines. Regardless, electronic control system 400 may be implemented on physical hardware, such as in frozen drink maker 100.

As also shown in FIG. 4, control system 400 may include a user interface 212 and/or 112, having, for example, a keyboard, keypad, one or more buttons, dials, touchpad, or sensor readout (e.g., biometric scanner) and one or more output devices, such as displays, speakers for audio, LED indicators, and/or light indicators. Control system 400 may also include communications interfaces 410, such as a network communication unit that could include a wired communication component and/or a wireless communications component, which may be communicatively coupled to controller and/or processor 402. The network communication unit may utilize any of a variety of proprietary or standardized network protocols, such as Ethernet, TCP/IP, to name a few of many protocols, to effect communications between processor 402 and another device, network, or system. Network communication units may also comprise one or more transceivers that utilize the Ethernet, power line communication (PLC), Wi-Fi, cellular, and/or other communication methods. For example, control system 400 may send one or more communications associated with a status of frozen drink maker 100 to a mobile device of a user, e.g., send an alert to the mobile device when a recipe is complete and/or a drink product is ready for dispensing, or to indicate that the mixing vessel is low or out of a drink product.

Control system 400 may include a processing element, such as controller and/or processor 402, that contains one or more hardware processors, where each hardware processor may have a single or multiple processor cores. In one implementation, the processor 402 includes at least one shared cache that stores data (e.g., computing instructions) that are utilized by one or more other components of processor 402. For example, the shared cache may be a locally cached data stored in a memory for faster access by components of the processing elements that make up processor 402. Examples of processors include but are not limited to a central processing unit (CPU) and/or microprocessor. Controller and/or processor 402 may utilize a computer architecture base on, without limitation, the Intel® 8051 architecture, Motorola® 68HCX, Intel® 80X86, and the like. The processor 402 may include, without limitation, an 8-bit, 12-bit, 16-bit, 32-bit, or 64-bit architecture. Although not illustrated in FIG. 4, the processing elements that make up processor 402 may also include one or more other types of hardware processing components, such as graphics processing units (GPUs), application specific integrated circuits (ASICs), field-programmable gate arrays (FPGAs), and/or digital signal processors (DSPs).

FIG. 4 also illustrates that memory 404 may be operatively and communicatively coupled to controller 402. Memory 404 may be a non-transitory medium configured to store various types of data. For example, memory 404 may include one or more storage devices 408 that include a non-volatile storage device and/or volatile memory. Volatile memory, such as random-access memory (RAM), can be any suitable non-permanent storage device. The non-volatile storage devices 408 may include one or more disk drives, optical drives, solid-state drives (SSDs), tape drives, flash memory, read-only memory (ROM), and/or any other type of memory designed to maintain data for a duration time after a power loss or shut down operation. In certain configurations, the non-volatile storage devices 408 may be used to store overflow data if allocated RAM is not large enough to hold all working data. The non-volatile storage devices 408 may also be used to store programs that are loaded into the RAM when such programs are selected for execution. Data store and/or storage devices 408 may be arranged to store a plurality of drink product making and/or processing instruction programs associated with a plurality of drink product processing sequences, i.e., recipes. Such drink product making and/or processing instruction programs may include instruction for controller and/or processor 402 to: start or stop one or motors and/or compressors 414 (e.g., such as motor 208 and/or compressor 214), start or stop compressor 214 to regulate a temperature of a drink product being processed within mixing vessel 104, operate the one or more motors 414 (e.g., motor 208 and/or compressor 214) at certain periods during a particular drink product processing sequence, operate motor 208 at certain speeds during certain periods of time of a recipe, issue one or more cue instructions to user interface 412 and/or 112 that are output to a user to illicit a response, action, and/or input from the user.

Persons of ordinary skill in the art are aware that software programs may be developed, encoded, and compiled in a variety of computing languages for a variety of software platforms and/or operating systems and subsequently loaded and executed by processor 402. In one implementation, the compiling process of the software program may transform program code written in a programming language to another computer language such that the processor 402 is able to execute the programming code. For example, the compiling process of the software program may generate an executable program that provides encoded instructions (e.g., machine code instructions) for processor 402 to accomplish specific, non-generic, particular computing functions.

After the compiling process, the encoded instructions may be loaded as computer executable instructions or process steps to processor 402 from storage 408, from memory 404, and/or embedded within processor 402 (e.g., via a cache or on-board ROM). Processor 402 may be configured to execute the stored instructions or process steps in order to perform instructions or process steps to transform the electronic control system 400 into a non-generic, particular, specially programmed machine or apparatus. Stored data, e.g., data stored by a data store and/or storage device 408, may be accessed by processor 402 during the execution of computer executable instructions or process steps to instruct one or more components within control system 400 and/or other components or devices external to system 400. For example, the recipes may be arranged in a lookup table and/or database within data store 408 and be accessed by processor 402 when executing a particular recipe selected by a user via user interface 412 and/or 112.

User interface 412 and/or 112 can include a display, positional input device (such as a mouse, touchpad, touchscreen, or the like), keyboard, keypad, one or more buttons, one or more dials, a microphone, speaker, or other forms of user input and output devices. The user interface components may be communicatively coupled to processor 402. When the user interface output device is or includes a display, the display can be implemented in various ways, including by a liquid crystal display (LCD) or a cathode-ray tube (CRT) or light emitting diode (LED) display, such as an OLED display.

Sensor(s) 406 may include one or more sensors that detect and/or monitor conditions of a drink product within mixing vessel 104, conditions associated with a component of the frozen drink maker 100, and/or conditions of a refrigerant and/or coolant within the refrigeration circuit and/or system. Conditions may include, without limitation, rotation, speed of rotation, and/or movement of a device or component (e.g., a motor), rate of such movement, frequency of such movement, direction of such movements, motor current, motor voltage, motor power, motor torque, temperature, pressure, fluid level in vessel 104, position of a device or component (e.g., whether pour-in opening 106 is open or closed), and/or the presence of a device or component (e.g., whether shroud 116 is installed or not). Types of sensors may include, for example, electrical metering chips, Hall sensors, pressure sensors, temperature sensors, optical sensors, current sensors, torque sensors, voltage sensors, cameras, other types of sensors, or any suitable combination of the foregoing. Frozen drink maker 100 may include one or more temperature sensors positioned in various locations within mixing vessel 104 such as, for example, on or about the lower front area within mixing vessel 104, on or about the upper front area within mixing vessel 104, on or about the upper rear area within vessel 104, within one or more coils of evaporator 202, and/or within housing 102.

Sensors 406 may also include one or more safety and/or interlock switches that prevent or enable operation of certain components, e.g., a motor, when certain conditions are met (e.g., enabling activation of motor 208 and/or 414 when a lid or cover for opening 106 is attached or closed and/or when a sufficient level of drink product is in vessel 104). Persons of ordinary skill in the art are aware that electronic control system 400 may include other components well known in the art, such as power sources and/or analog-to-digital converters, not explicitly shown in FIG. 4.

In some implementations, control system 400 and/or processor 402 includes an SoC having multiple hardware components, including but not limited to:

- a microcontroller, microprocessor or digital signal processor (DSP) core and/or multiprocessor SoCs (MPSoC) having more than one processor cores;
- memory blocks including a selection of read-only memory (ROM), random access memory (RAM), electronically erasable programmable read-only memory (EEPROM) and flash memory;
- timing sources including oscillators and phase-docked loops;
- peripherals including counter-timers, real-time timers and power-on reset generators;
- external interfaces, including industry standards such as universal serial bus (USB), Fire Wire, Ethernet, universal synchronous/asynchronous receiver/transmitter (USART), serial peripheral interface (SPI);
- analog interfaces including analog-to-digital converters (ADCs) and digital-to-analog converters (DACs); and
- voltage regulators and power management circuits.

A SoC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB).

Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some implementations, various components of control system 400 are implemented on a PCB such as PCB 222.

In operation in certain implementations, a user fills mixing vessel 104 via pour-in opening 106 with ingredients associated with a drink product. The user selects the type of frozen product to be processed via user interface 112, e.g., the user selects the recipe for "margarita." In some implementations, the user selects the product type and/or recipe before filling the mixing vessel 104 and the user interface 112 provides one or more indicators or queues (visible and/or audible) that instruct the user to add ingredients to mixing vessel 104. Mixing vessel 104 may include one or more fill sensors that detect when a sufficient amount or level of ingredients and/or fluid is within mixing vessel 104. The one or more fill sensors may provide a signal to processor 402 that indicates when vessel 104 is sufficiently filled or not filled. Processor 402 may prevent operations of the frozen drink maker 100 (e.g., prevent activation of motor 208 and/or other components) if the fill sensor(s) 406 indicate that vessel 104 is not sufficiently filled. A lid sensor may be associated with opening 106 whereby the lid sensor sends an open and/or closed signal to processor 402 that indicates whether opening 106 is open or closed. Processor 402 may prevent operations of the frozen drink maker 100 if the lid sensor indicates that opening 106 is open and/or not closed. Depending on the sensed condition, user interface 112 may provide an indication regarding the condition, e.g., that vessel 104 is sufficiently filled or not sufficiently filled and/or that opening 106 is not closed, to enable a user to take appropriate action(s).

Once mixing vessel 104 is filled with ingredients, the user may provide an input, e.g., a button press, to start processing of the drink product based on the selected recipe. Processing may include activation of motor 208 to drive rotation of dasher 204 and/or blade 206 to effect mixing of the ingredients of the drink product. Processing may also include activation of the refrigeration system including activation of compressor 214 and condenser fan 218. The compressor 214 facilitates refrigerant flow through one or more coils of evaporator 202 and through condenser 216 to provide cooling and/or temperature control of the drink product within mixing vessel 104. Processor 402 may control operations of various components such as motor 208 and compressor 214. To regulate temperature at a particular setting associated with a recipe, processor 402 may activate/start and/or deactivate/stop compressor 214 to start and/or stop refrigerant flow through the coil(s) of evaporator 202 and, thereby, start or stop cooling of the drink product within mixing vessel 104.

By cooling a drink product to a particular temperature, slush and/or ice particles may be formed within the drink product. Typically, the amount of particles and/or texture of a drink product corresponds to a temperature of the drink product, i.e., the cooler the temperature—the larger the amount of particles (and/or the larger the size of particles) and/or the more slushi the drink product. User interface 112 may enable a user to fine tune and/or adjust a preset temperature associated with a recipe to enable a user to adjust the temperature and/or texture of a drink product to a more desirable temperature and/or texture.

Processor 402 may perform processing of the drink product for a set period of time in one or more phases and/or until a desired temperature and/or texture is determined. Processor 402 may receive one or more temperature signals from one or more temperature sensors 408 within mixing vessel 104 to determine the temperature of the drink product. Processor 402 may determine the temperature of the drink product by determining a average temperature among temperatures detected by multiple temperature sensors 408. Processor 402 may determine the temperature of the drink product based on the detected temperature from one sensor 408 within mixing vessel 104 and/or based on a temperature of the refrigerant detected by a refrigerant temperature sensor 408. Once a phase and/or sequence of a recipe is determined to be completer by processor 402, processor 402 may, via user interface 116, provide a visual and/or audio indication that the recipe is complete and ready for dispensing. In response, a user may place a cup or container below dispenser assembly 108 and pull handle 120 in a downward direction to open a spout located at about the lower front wall of mixing vessel 104, resulting in dispensing of the drink product into the cup or container. Once filled, the user can close the spout by pushing handle 120 back to its upright position shown in FIG. 2.

Figure 5A:
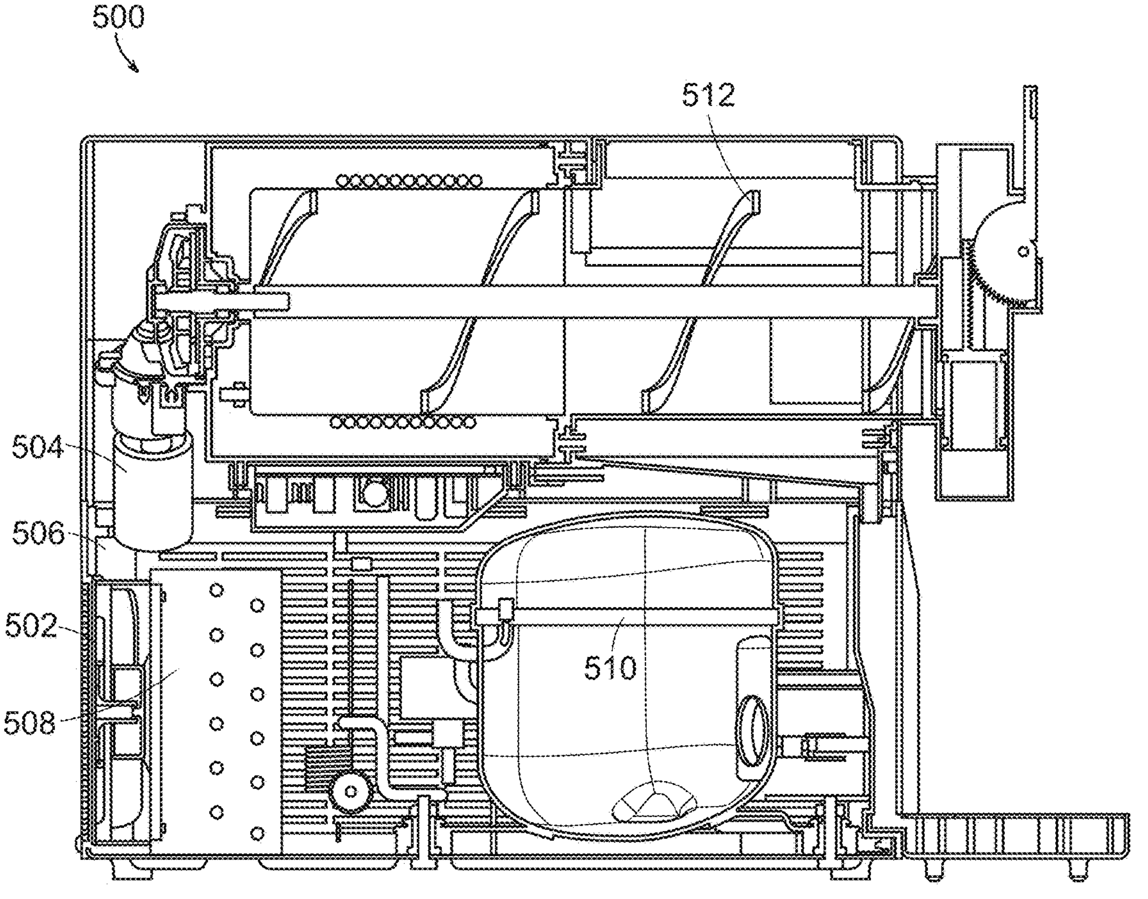
FIG. 5A shows an implementation of a dual-use cooling fan within the housing of a drink maker.

FIG. 5A shows a dual-use cooling fan 502 within a housing of a drink maker 500 including a refrigeration system having a condenser 508 and compressor 510. Drink maker 500 also includes a drive motor 504 configured to drive rotation of dasher 512 during processing of a drink product. Dual-use cooling fan 502 draws an air flow through condenser 508 and directs the air flow, via an air channel 506, toward drive motor 504. The air flow passes over and adjacent to condenser coils as it passes through condenser 508 to cool the refrigerant passing through condenser 508 within a closed loop refrigeration system. The air flow also passes along a surface and/or surfaces of drive motor 504 to effect cooling of drive motor 504. While FIG. 5A shows a configuration where drive motor 504 and condenser 508 are positioned at about right angles with respect to dual-use cooling fan 502, other configurations, arrangements, or orientations may be implemented such that dual-use cooling fan 502 provides a cooling air flow to condenser 508 and drive motor 504.

In some implementations, a drink maker, such as drink maker 500, includes a mixing vessel, like mixing vessel 104, arranged to receive a drink product. The drink maker 500 includes a mixing component such as dasher 512 or another type of mixing component, driven by drive motor 512, that is arranged to mix the drink product within the mixing vessel 104. A refrigeration system is arranged to cool the drink product within mixing vessel 104 that includes a condenser, such as condenser 508. Cooling fan 502, i.e., a dual-use cooling fan, is configured to concurrently cool the drive motor 504 and the condenser 508. Cooling fan 502 may provide air flow through condenser 508 to cool refrigerant flowing through condenser 508. Cooling fan 502 may provide air flow along a surface of drive motor 504 to cool the drive motor 504. Cooling fan 502, drive motor 504, and condenser 508 may be positioned such that air generated by cooling fan 502 passes serially through condenser 508 and along a surface of the drive motor 504.

A first portion of air generated by cooling fan 502 may cool condenser 508 and a second portion of air generated by cooling fan 502 may cool drive motor 504. Condenser 508 may include a plurality of coils that carry coolant and/or refrigerant within a closed loop of the refrigeration circuit. When cooling fan 502 provides air flow through condenser 508 to cool refrigerant flowing through condenser 508, the air flow may travel adjacent to and/or around the plurality of coils. A cooling channel 506 may extend between cooling fan 502 and drive motor 504 where cooling channel 506 provides cooling air flow between cooling fan 502 and drive motor 504. Cooling channel 506 may be at least partially formed by a duct and/or ducting. The ducting may include plastic, metals, composite materials, and the like. A cooling channel may extend between cooling fan 502 and condenser 508, where the cooling channel provides cooling air flow between cooling fan 502 and condenser 508. The cooling channel may be at least partially formed by a duct. Cooling fan 502 and 522 may include a centrifugal fan, a cross-flow fan, a tangential fan, a volute fan, a backward curved fan, a forward curved fan, a blower fan, a squirrel-cage fan, and/or an axial fan.

In some implementations, a cooling fan, such as cooling fan 502, is configured for cooling a drive motor, such as drive motor 504, and a condenser, such as condenser 508, within a housing of a drink maker. Cooling fan 502 may include an air inlet configured to receive an air flow, an impeller configured to generate the air flow; and an air outlet configured to output the air flow through condenser 508 and along a surface of the drive motor 504.

Figure 5B:
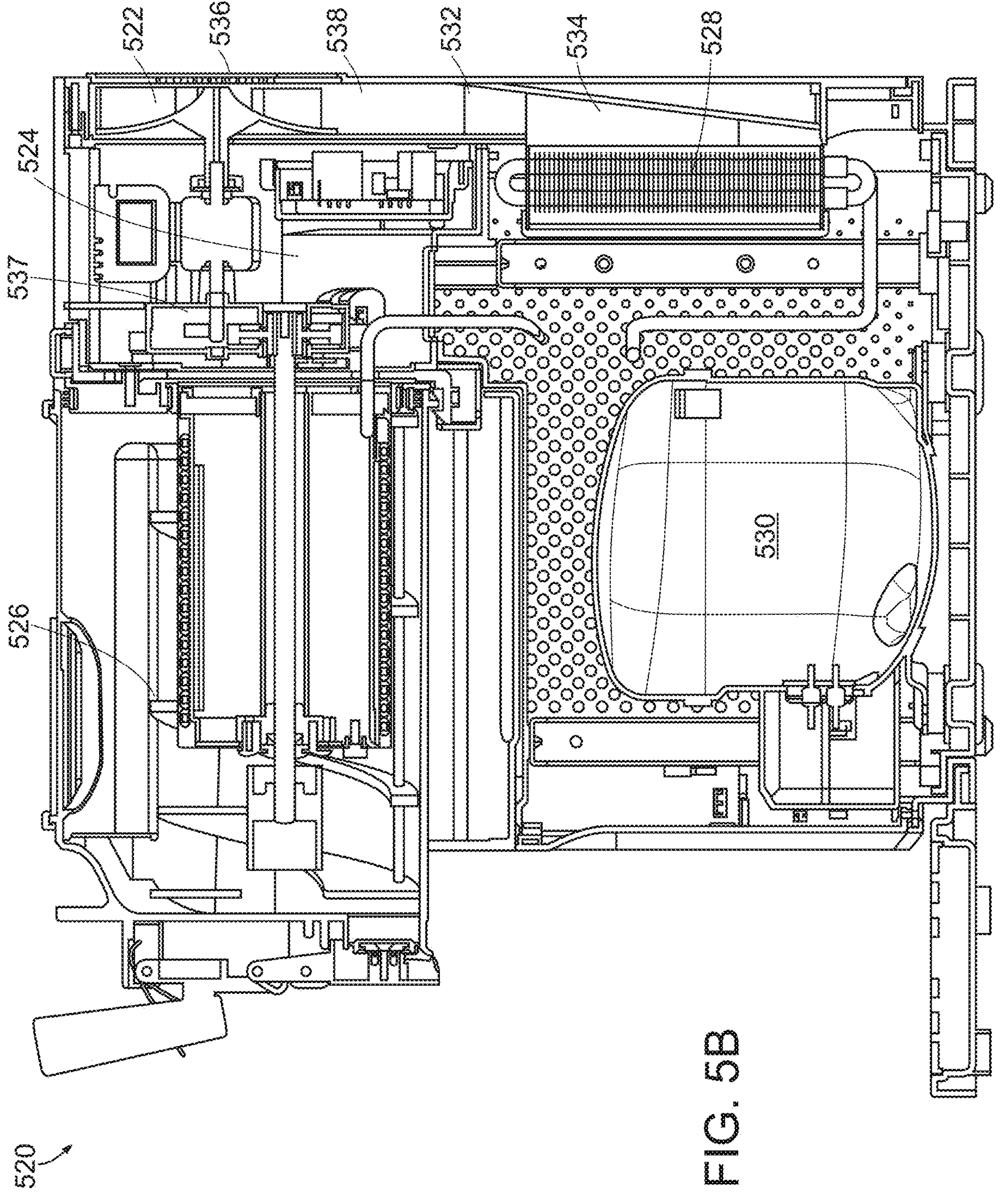
FIG. 5B shows another implementation of a dual-use cooling fan within the housing of a drink maker.

FIG. 5B shows another implementation of a dual-use cooling fan 522 within the housing of a drink maker 520 including a drive motor 524, a dasher 526, a compressor 530, and a condenser 528. The drive motor 524 is coupled to and drives rotation of the dasher and also drives rotation of the cooling fan 522 via gears 537. Cooling fan 522 includes an air outlet 538 that directs air flow from cooling fan 522 through air channel 532 which may include ducting 534 that directs air flow through condenser 528 to cool refrigerant flowing through condenser 538.

Figure 5C:
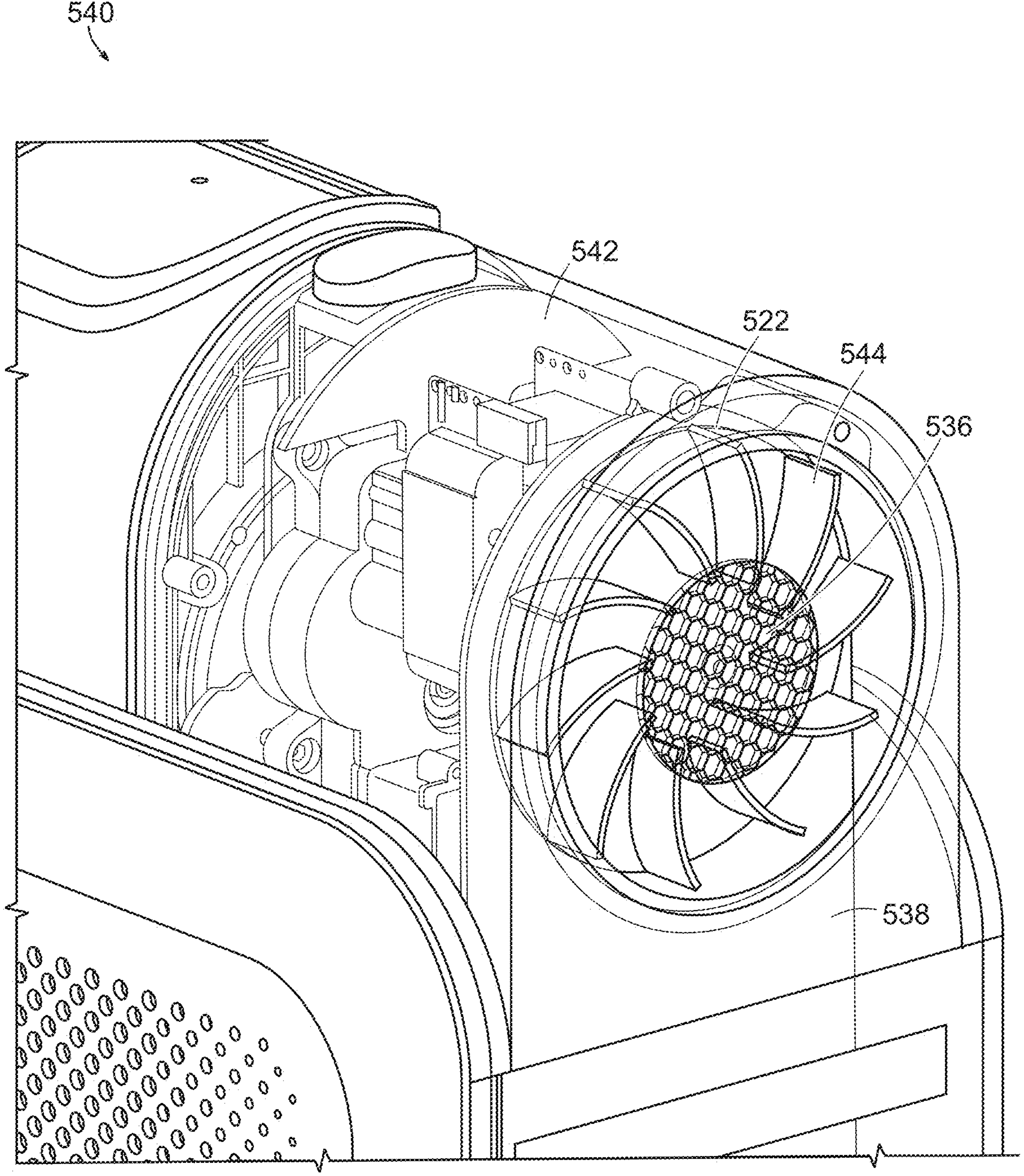
FIG. 5C shows a perspective view of the dual-use cooling fan of FIG. 5B.

FIG. 5C shows a perspective view 540 of the dual-use cooling fan 522 within housing 542 of drink maker 520. Cooling fan 522 may be a centrifugal fan and/or another type of fan as described herein. Cooling fan 522 may include an impeller 544 that draws air flow into cooling fan 522 via inlet 536 and then expels air downward at about a right angle via outlet 538 with respect to inlet 536. The air flow exiting outlet 538 flows downward past drive motor 524, including along a surface of drive motor 524, and through air channel 532, which may include ducting 534 that directs the air flow through condenser 528 (adjacent to and/or around coils of condenser 528) to effect cooling of refrigerant passing through the coils.

Figure 6:
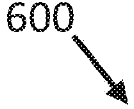
FIG. 6 is a flow diagram of a process for operating the dual-use fan.
Figure 6:
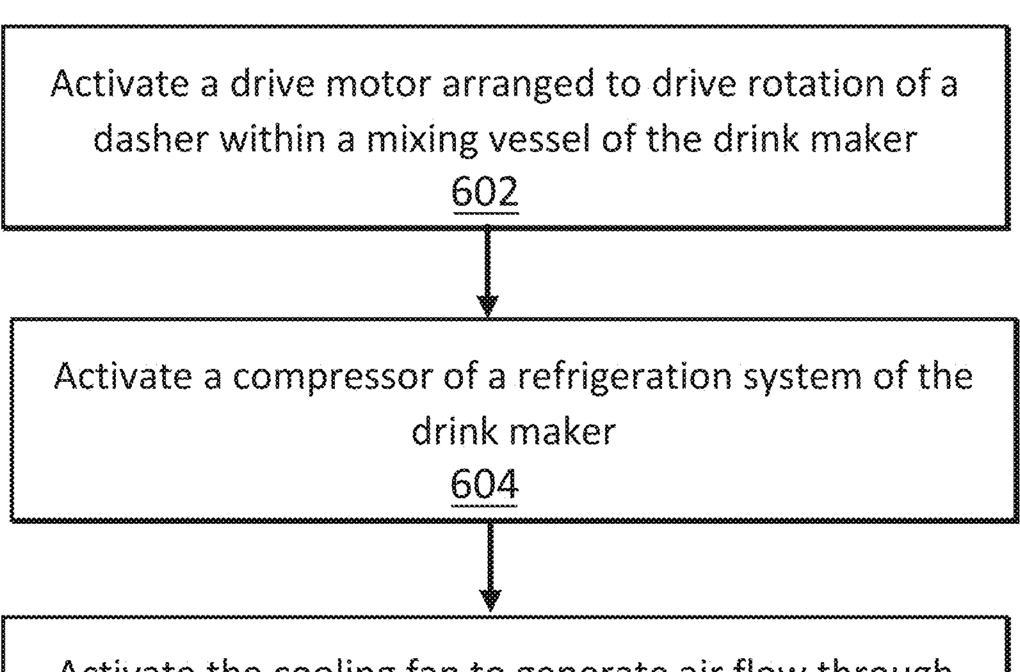

FIG. 6 is a flow diagram of a process 600 for operating dual-use cooling fan 502 or 522 of FIGS. 5A and 5B respectively. Process 600 facilitates concurrently cooling condenser 508 (or condenser 528) and drive motor 504 (or drive motor 524) within a housing of a drink maker using a cooling fan 502 or 522 respectively by: activating drive motor 504 (or drive motor 524) that is arranged to drive rotation of dasher 512 (or dasher 526) within a mixing vessel of a drink maker (Step 602); activating compressor 508 (or compressor 530) of a refrigeration circuit of the drink maker (Step 604); and activating cooling fan 502 (or cooling fan 522) to concurrently generate air flow through condenser 508 (or condenser 528) and along a surface of drive motor 504 (or drive motor 524) (Step 606).

It should be appreciated that the various implementations described herein are not limited to making frozen or semi-frozen drinks, but may be applied to produce a cold and/or cooled drink product that is cooler than a received drink product, but not frozen or semi-frozen. For example, in some implementations, the same or similar mechanisms and/or techniques may be used as part of a cold drink machine and/or cooled drink maker to produce, maintain and dispense cold drinks.

As discussed with respect to FIG. 4, actions associated with configuring or controlling a frozen drink maker such as frozen drink maker 100 and processes described herein can be performed by one or more programmable processors executing one or more computer programs to control or to perform all or some of the operations described herein. All or part of the frozen drink maker 100 systems and processes can be configured or controlled by special purpose logic circuitry, such as, an FPGA and/or an ASIC or embedded microprocessor(s) localized to the instrument hardware.

Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

What is claimed is:

1. A drink maker comprising:

a housing;

a mixing vessel arranged to receive a drink product;

a dasher, driven by a drive motor, arranged to mix the drink product within the mixing vessel;

a refrigeration circuit arranged to cool the drink product within the mixing vessel, the refrigeration circuit including a condenser;

a cooling fan;

an air inlet;

an air outlet; and an air channel in a portion of the housing, the air channel comprising ducting extending from the air outlet toward the condenser, wherein the air channel directs air flow through the housing, and wherein the cooling fan draws air flow into the drink maker and the cooling fan via the air inlet, and the cooling fan expels the air flow from the cooling fan via the air outlet, causing the air flow to flow: (a) over a surface of the drive motor, then (b) through the ducting of the air channel, then (c) through the condenser, to cool the drive motor and the condenser.

2. The drink maker of claim 1, wherein the cooling fan provides the air flow through the condenser to cool refrigerant flowing through the condenser.

3. The drink maker of claim 1, wherein the cooling fan, the drive motor, and the condenser are positioned such that the air flow generated by the cooling fan passes serially through the condenser and along a surface of the drive motor.

4. The drink maker of claim 1, wherein the condenser includes one or more coils.

5. The drink maker of claim 4, wherein when the cooling fan provides the air flow through the condenser to cool refrigerant flowing through the condenser, the air flow travels adjacent to the one or more coils.

6. The drink maker of claim 1, further comprising a cooling channel within the housing extending between the cooling fan and the drive motor, the cooling channel providing at least a portion of the air flow between the cooling fan and the drive motor.

7. The drink maker of claim 6, wherein the cooling channel is at least partially formed by a duct.

8. The drink maker of claim 1, wherein the cooling fan includes one of a centrifugal fan, a cross-flow fan, a tangential fan, a volute fan, a backward curved fan, a forward curved fan, a blower fan, a squirrel-cage fan, and an axial fan.

9. The drink maker of claim 1, wherein the cooling fan is the only fan in the drink maker.

10. A cooling fan for cooling a drive motor and a condenser within a housing of a drink maker, the drive motor driving rotation of a dasher within a mixing vessel of the drink maker and the condenser cooling a refrigerant circulating within a refrigeration circuit of the drink maker, the cooling fan comprising an impeller generating an air flow, wherein the cooling fan draws the air flow into the drink maker and the cooling fan via an air inlet, and the cooling fan expels the air flow from the cooling fan via an air outlet, causing the air flow to flow: (a) over a surface of the drive motor, then (b) through ducting of an air channel in a portion of the housing, wherein the air channel directs air flow through the housing and the ducting extends from the air outlet toward the condenser, then (c) through the condenser, to cool the drive motor and the condenser.

11. The cooling fan of claim 10, wherein the cooling fan includes one of a centrifugal fan, a cross-flow fan, a tangential fan, a volute fan, a backward curved fan, a forward curved fan, a blower fan, a squirrel-cage fan, and an axial fan.

12. A method for cooling a condenser and a drive motor within a housing of a drink maker using a cooling fan comprising:

activating the drive motor arranged to drive rotation of a dasher within a mixing vessel of the drink maker;

activating a compressor of a refrigeration circuit of the drink maker; and activating the cooling fan to generate air flow through the condenser and along a surface of the drive motor, wherein the cooling fan, when activated, draws the air flow into the drink maker and the cooling fan via an air inlet and expels the air flow from the cooling fan via an air outlet, causing the air flow to flow: (a) over a surface of the drive motor, then (b) through ducting of an air channel in a portion of the housing, wherein the air channel directs air flow through the housing and the ducting extends from the air outlet toward the condenser, then (c) through the condenser, to cool the drive motor and the condenser.

13. The method of claim 12, comprising receiving a user input to activate the drive motor, compressor, and the cooling fan.

14. The method of claim 13, wherein the user input initiates a recipe, controlled by a controller, that automatically activates the drive motor, compressor, and the cooling fan.

15. The method of claim 12, wherein the cooling fan includes one of a centrifugal fan, a crossflow fan, a tangential fan, a volute fan, a backward curved fan, a forward curved fan, a blower fan, a squirrel-cage fan, and an axial fan.

* * * * *